United States Patent
Liang et al.

(10) Patent No.: US 12,492,170 B2
(45) Date of Patent: Dec. 9, 2025

(54) TETRAHYDRO-1H-BENZAZEPINE COMPOUND AS POTASSIUM CHANNEL MODULATOR, PREPARATION METHOD AND USE THEREOF

(71) Applicant: Shanghai Zhimeng Biopharma Inc., Shanghai (CN)

(72) Inventors: Bo Liang, Shanghai (CN); Qiu Jin, Shanghai (CN); Huanming Chen, Shanghai (CN); Zhijun Zhang, Shanghai (CN); Bo Hua, Shanghai (CN)

(73) Assignee: SHANGHAI ZHIMENG BIOPHARMA, INC., Shanghai (CN)

( * ) Notice: Subject to any disclaimer, the term of this patent is extended or adjusted under 35 U.S.C. 154(b) by 930 days.

(21) Appl. No.: 17/614,780

(22) PCT Filed: May 26, 2020

(86) PCT No.: PCT/CN2020/092401
§ 371 (c)(1),
(2) Date: Nov. 29, 2021

(87) PCT Pub. No.: WO2020/238917
PCT Pub. Date: Dec. 3, 2020

(65) Prior Publication Data
US 2022/0227713 A1 Jul. 21, 2022

(30) Foreign Application Priority Data
May 31, 2019 (CN) .................. 201910473074.X

(51) Int. Cl.
*C07D 223/16* (2006.01)
*C07D 409/06* (2006.01)
(52) U.S. Cl.
CPC ......... *C07D 223/16* (2013.01); *C07D 409/06* (2013.01)
(58) Field of Classification Search
CPC .......... A61P 21/00; A61P 25/00; A61P 25/06; A61P 25/08; A61P 25/14; A61P 25/16; A61P 25/28; A61P 29/00; A61P 31/04; A61P 31/14; A61P 31/22; A61P 9/10; C07D 223/16; C07D 409/06; A61K 31/55
See application file for complete search history.

(56) References Cited

FOREIGN PATENT DOCUMENTS

CN 103508960 A * 1/2014 ........... C07D 209/08

OTHER PUBLICATIONS

University of Nebraska Lincoln (Environmental Health and Safety, Toxicology and Exposure guidelines, Jan. 2003) (Year: 2003).*
Hill et al (Angew. Chem. Int. Ed. 2018, 57, 5788 -5791). (Year: 2018).*

* cited by examiner

*Primary Examiner* — Jean P Cornet
(74) *Attorney, Agent, or Firm* — Panitch Schwarze Belisario & Nadel LLP

(57) ABSTRACT

A tetrahydro-1H-benzazepine compound as a potassium channel modulator, a preparation method, and a medicament containing the compound are provided. Specifically, the compound has the structure shown by formula A, in which the definitions of each group and substituent are described in the description. A preparation method for the compound and its use as potassium channel modulator are also described.

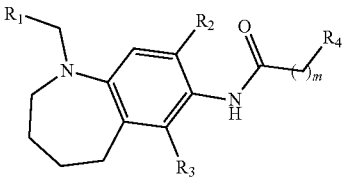

Formula A

9 Claims, No Drawings

TETRAHYDRO-1H-BENZAZEPINE COMPOUND AS POTASSIUM CHANNEL MODULATOR, PREPARATION METHOD AND USE THEREOF

CROSS-REFERENCE TO RELATED APPLICATIONS

This application is a Section 371 of International Application No. PCT/CN2020/092401, filed May 26, 2020, which was published in the Chinese language on Dec. 3, 2020 under International Publication No. WO 2020/238917 A1, which claims priority under 35 U.S.C. § 119 (b) to Chinese Application No. 201910473074.X, filed on May 31, 2019, the disclosures of which are incorporated herein by reference in their entireties.

TECHNICAL FIELD

The present invention relates to the field of biopharmaceutical, and in particular to tetrahydro-1H-benzazepine compound as potassium channel modulator, a preparation method and a use thereof.

BACKGROUND ART

Kv7 potassium channel is a type of voltage-dependent potassium ion channel with low threshold activation, slow activation and non-inactivation. The Kv7 potassium channel has five family members (Kv7.1-Kv7.5), all of which have similar topology, namely four subunits form a functional channel, and each subunit contains six transmembrane fragments (S1-S6). Among which, S4 is a voltage sensing region which plays an important role in sensing membrane potential changes and controlling conformational changes; SS-S6 is the main components of the channel aperture region, and is the main combination and action region of potassium channel openers. Kv7.1 potassium channel is a non-neuronal pathway, which is distributed in the outer peripheral tissue, expressed in the heart to mediate myocardial Iks, and its mutation can lead to Long Q-T syndrome. Kv7.2-Kv7.5 potassium channel is the basis of neuronal M current, is widely distributed in the nervous system, and has a variety of physiological activity. Kv7.2 and Kv7.3 potassium channel gene mutation can lead to a variety of different epilepsy patterns, such as Benign familial neonatal convulsions (BFNC), which fully demonstrates the role of M current in regulating neuronal excitability. Kv7.4 potassium channel is highly expressed in the outer hair cells of the cochlea and brainstem auditory nucleus, and its mutation may cause hereditary deafness. Kv7.5 potassium channels are highly expressed in skeletal muscle and brain, and its mutation may cause retinopathy. Many diseases such as epilepsy, anxiety, deafness, etc., their common feature is high membrane excitability, and Kv7 potassium channels are the molecular basis of M current, which can be opened by sensing changes in membrane potential, so that the inhibitory potassium current is up-regulated, thus controlling membrane excitability so as to make the Kv7 potassium channels are of great significance in pain and mental illness represented by high nerve excitability.

Retigabine is a drug for treating epilepsy. It has been approved for marketing in the UK, Germany, and Denmark. Studies have confirmed that the role of Retigabine is related to the voltage-gated potassium ion channel (KCNQs), wherein its main mechanism of action is to regulate M-type potassium currents by acting on KCNQ2/3 channels.

Retigabine (RTG) is the first Kv7 potassium channel opener for assisting the treatment of adult partial-onset epilepsy marketed in 2011. In addition to anti-epilepsy, RTG can also be used to treat anxiety, neuralgia, and neurodegenerative diseases. RTG can effectively reduce or prevent seizures in a variety of epilepsy models. RTG shows effective anti-epileptic effects on both tonic seizures caused by the maximal electroshock seizure (MES) model and clonic seizures induced by PTZ. In addition, RTG can also prevent seizures caused by N-methyl-D-aspartate (NMDA), penicillin, picrotoxin, Kainic acid (KA), etc. The ignition model is suitable for screening a variety of antiepileptic drugs, and the effect of RTG on this model is stronger than other models. Due to the extensive effects of RTG on all Kv7 potassium channel members and other channels, its poor selectivity makes it potentially harmful. A large number of literatures have reported that RTG has a high incidence of adverse events related to the central nervous system, which can lead to dizziness, fatigue, aphasia, speech disorders, balance disorders and other adverse reactions including kidney stones, urinary retention and other kidney and urinary system diseases, cardiac related diseases such as sudden cardiac arrest, transient non-sustained ventricular tachycardia, and can also cause retinal discoloration, blue/purple pigmentation on skin, nails and the like.

SUMMARY OF THE INVENTION

It is an object of the present invention to provide a compound of formula A and a preparation method thereof and its use as a potassium ion channel opener.

In the first aspect of the invention, a compound of formula A or a pharmaceutically acceptable salt thereof is provided.

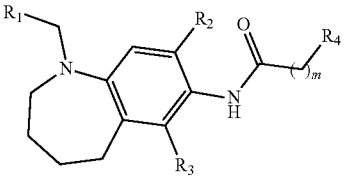

Formula A wherein, $R_1$ is a substituted or unsubstituted group selected from the group consisting of $C_{6-10}$ aryl, 4-7 membered heteroaryl containing 1-3 heteroatoms selected from N, O or S, and the substituted means being substituted by one or more substituents selected from the group consisting of halogen, nitro, cyano, $C_{1-6}$ alkyl, $C_{3-6}$ cycloalkyl, $C_{1-6}$ alkoxy, $C_{3-6}$ cycloalkoxy, halogenated $C_{1-6}$ alkyl, halogenated $C_{1-6}$ alkoxy and $C_{1-6}$ alkylamine;

$R_2$ and $R_3$ are each independently selected from the group consisting of hydrogen, halogen, $C_{1-6}$ alkyl, $C_{1-6}$ alkoxy, halogenated $C_{1-6}$ alkyl, and halogenated $C_{1-6}$ alkoxy;

$R_4$ is a substituted or unsubstituted group selected from the group consisting of $C_{1-6}$ alkyl, $C_{3-6}$ cycloalkyl, and the substituted means being substituted by one or more substituents selected from the group consisting of halogen, nitro, cyano, $C_{1-6}$ alkyl, $C_{1-6}$ alkoxy, halogenated $C_{1-6}$ alkyl, halogenated $C_{1-6}$ alkoxy, $C_{2-6}$ alkenyl, $C_{2-6}$ alkynyl and $C_{3-6}$ cycloalkyl;

m is selected from the group consisting of 0, 1, 2, 3, 4, 5, and 6.

In another preferred embodiment,

R$_1$ is a substituted C$_{6-10}$ aryl, and the substituted means being substituted by 1, 2, 3, 4 or 5 substituents selected from the group consisting of halogen, nitro, cyano, C$_{1-6}$ alkyl, C$_{3-6}$ cycloalkyl, C$_{1-6}$ alkoxy, C$_{3-6}$ cycloalkoxy, halogenated C$_{1-6}$ alkyl, halogenated C$_{1-6}$ alkoxy and C$_{1-6}$ alkylamine;

R$_2$ and R$_3$ are each independently selected from the group consisting of hydrogen, halogen, C$_{1-6}$ alkyl, C$_{1-6}$ alkoxy, halogenated C$_{1-6}$ alkyl, and halogenated C$_{1-6}$ alkoxy;

R$_4$ is a substituted or unsubstituted group selected from the group consisting of C$_{1-6}$ alkyl and C$_{3-7}$ cycloalkyl, and the substituted means being substituted by 1, 2, 3, 4 or 5 substituents selected from the group consisting of halogen, nitro, cyano, C$_{1-6}$ alkyl, C$_{1-6}$ alkoxy, halogenated C$_{1-6}$ alkyl, halogenated C$_{1-6}$ alkoxy, C$_{2-6}$ alkenyl, C$_{2-6}$ alkynyl and C$_{3-6}$ cycloalkyl;

m is selected from the group consisting of 0, 1, 2, 3, 4, 5, and 6.

In another preferred embodiment,

R$_1$ is a substituted C$_{6-10}$ aryl, and the substituted means being substituted by 1, 2, 3, 4 or 5 substituents selected from the group consisting of halogen, nitro, cyano, C$_{1-6}$ alkyl, C$_{3-6}$ cycloalkyl, C$_{1-6}$ alkoxy, C$_{3-6}$ cycloalkoxy, halogenated C$_{1-6}$ alkyl, halogenated C$_{1-6}$ alkoxy and C$_{1-6}$ alkylamine;

R$_2$ and R$_3$ are each independently selected from the group consisting of hydrogen, halogen, C$_{1-6}$ alkyl, C$_{1-6}$ alkoxy, halogenated C$_{1-6}$ alkyl, and halogenated C$_{1-6}$ alkoxy;

R$_4$ is an unsubstituted C$_{3-7}$ cycloalkyl;

m is selected from the group consisting of 0, 1, 2, 3, 4, 5, and 6.

In another preferred embodiment, R$_1$ is a substituted C$_{6-10}$ aryl, and the substituted means being substituted by 1, 2, 3, 4 or 5 substituents selected from the group consisting of halogen, nitro, cyano, C$_{1-6}$ alkyl, C$_{3-6}$ cycloalkyl, C$_{1-6}$ alkoxy, C$_{3-6}$ cycloalkoxy, halogenated C$_{1-6}$ alkyl, halogenated C$_{1-6}$ alkoxy and C$_{1-6}$ alkylamine.

In another preferred embodiment, R$_1$ is a halogenated C$_{6-10}$ aryl, such as a halogenated phenyl, more particularly, for example, monofluorophenyl.

In another preferred embodiment, R$_2$ and R$_3$ are each independently selected from the group consisting of hydrogen, halogen, C$_{1-6}$ alkyl, C$_{1-6}$ alkoxy, halogenated C$_{1-6}$ alkyl, and halogenated C$_{1-6}$ alkoxy.

In another preferred embodiment, R$_4$ is a substituted or unsubstituted group selected from the group consisting of C$_{1-6}$ alkyl and C$_{3-7}$ cycloalkyl, and the substituted means being substituted by 1, 2, 3, 4 or 5 substituents selected from the group consisting of halogen, nitro, cyano, C$_{1-6}$ alkyl, C$_{1-6}$ alkoxy, halogenated C$_{1-6}$ alkyl, halogenated C$_{1-6}$ alkoxy, C$_{2-6}$ alkenyl, C$_{2-6}$ alkynyl and C$_{3-6}$ cycloalkyl.

In another preferred embodiment, R$_4$ is an unsubstituted C$_{3-7}$ cycloalkyl.

In another preferred, m is selected from the group consisting of 0, 1, 2, 3, 4, 5 and 6.

In another preferred embodiment,

R$_1$ is a substituted or unsubstituted 4-7 membered heteroaryl containing 1, 2 or 3 heteroatoms selected from N, O or S, and the substituted means being substituted by 1, 2, 3, 4 or 5 substituents selected from the group consisting of halogen, nitro, cyano, C$_{1-6}$ alkyl, C$_{3-6}$ cycloalkyl, C$_{1-6}$ alkoxy, C$_{3-6}$ cycloalkoxy, halogenated C$_{1-6}$ alkyl, halogenated C$_{1-6}$ alkoxy and C$_{1-6}$ alkylamine;

R$_2$ and R$_3$ are each independently selected from the group consisting of hydrogen, halogen, C$_{1-6}$ alkyl, C$_{1-6}$ alkoxy, halogenated C$_{1-6}$ alkyl and halogenated C$_{1-6}$ alkoxy;

R$_4$ is a substituted or unsubstituted group selected from the group consisting of C$_{1-6}$ alkyl and C$_{3-7}$ cycloalkyl, and the substituted means being substituted by 1, 2, 3, 4 or 5 substituents selected from the group consisting of halogen, nitro, cyano, C$_{1-6}$ alkyl, C$_{1-6}$ alkoxy, halogenated C$_{1-6}$ alkyl, halogenated C$_{1-6}$ alkoxy, C$_{2-6}$ alkenyl, C$_{2-6}$ alkynyl and C$_{3-6}$ cycloalkyl;

m is selected from the group consisting of 0, 1, 2, 3, 4, 5 and 6.

In another preferred embodiment,

R$_1$ is a substituted 4-7 membered heteroaryl containing 1, 2 or 3 heteroatoms selected from N, O or S, and the substituted means being substituted by 1, 2, 3, 4 or 5 substituents selected from the group consisting of halogen, nitro, cyano, C$_{1-6}$ alkyl, C$_{3-6}$ cycloalkyl, C$_{1-6}$ alkoxy, C$_{3-6}$ cycloalkoxy, halogenated C$_{1-6}$ alkyl, halogenated C$_{1-6}$ alkoxy and C$_{1-6}$ alkylamine;

R$_2$ and R$_3$ are each independently selected from the group consisting of hydrogen, halogen, C$_{1-6}$ alkyl, C$_{1-6}$ alkoxy, halogenated C$_{1-6}$ alkyl and halogenated C$_{1-6}$ alkoxy;

R$_4$ is an unsubstituted group selected from the group consisting of C$_{1-6}$ alkyl and C$_{3-7}$ cycloalkyl;

m is selected from the group consisting of 0, 1, 2, 3, 4, 5 and 6.

In another preferred embodiment, R$_1$ is a substituted 4-7 membered heteroaryl containing 1, 2 or 3 heteroatoms selected from N, O or S, and the substituted means being substituted by 1, 2, 3, 4 or 5 substituents selected from the group consisting of halogen, nitro, cyano, C$_{1-6}$ alkyl, C$_{3-6}$ cycloalkyl, C$_{1-6}$ alkoxy, C$_{3-6}$ cycloalkoxy, halogenated C$_{1-6}$ alkyl, halogenated C$_{1-6}$ alkoxy and C$_{1-6}$ alkylamine.

In another preferred embodiment, R$_1$ is a halogenated 4-7 membered heteroaryl containing 1, 2 or 3 heteroatoms selected from N, O or S, such as halogenated thiophene.

In another preferred embodiment, R$_4$ is an unsubstituted group selected from the group consisting of C$_{1-6}$ alkyl and C$_{3-7}$ cycloalkyl.

In another preferred embodiment, the compound is selected from the group consisting of:

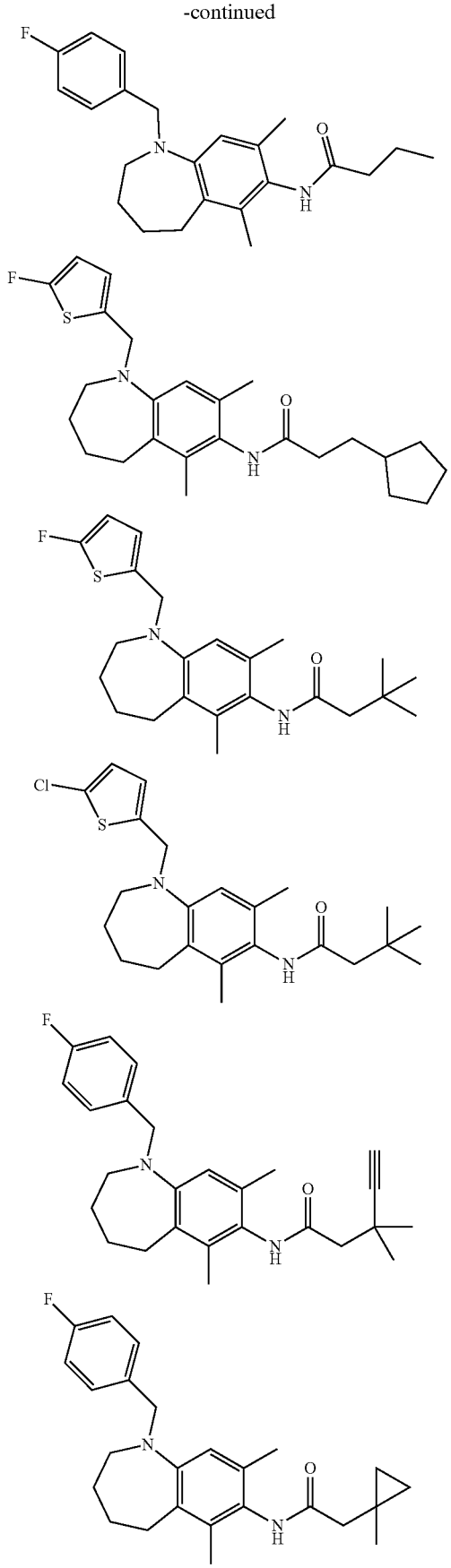
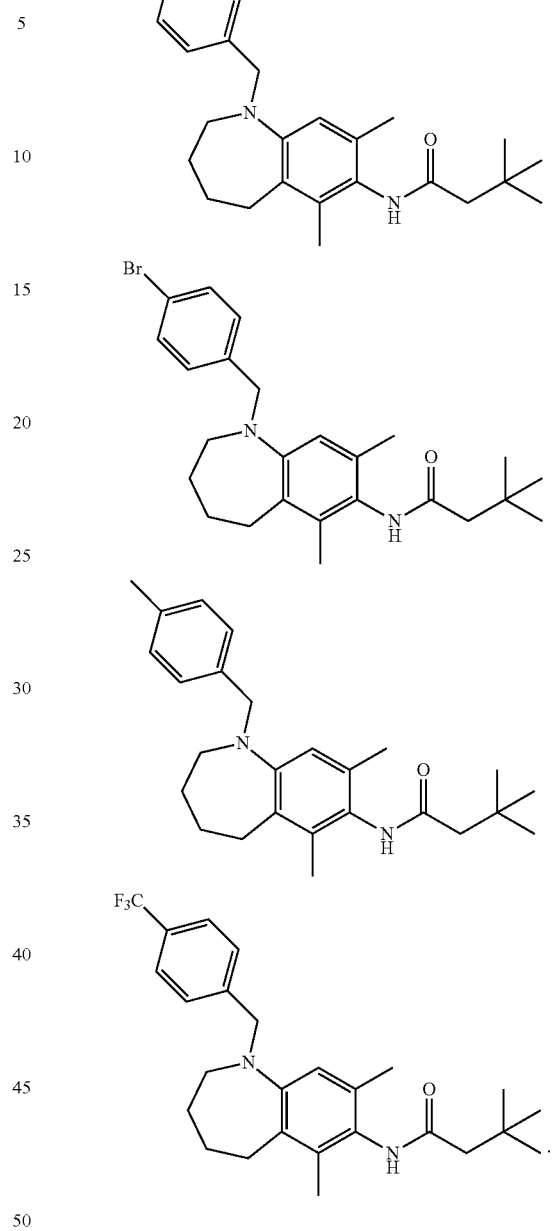
In the second aspect of the invention, a method for preparing the compound according to the first aspect of the invention or a pharmaceutically acceptable salt thereof is provided, which comprises the steps:
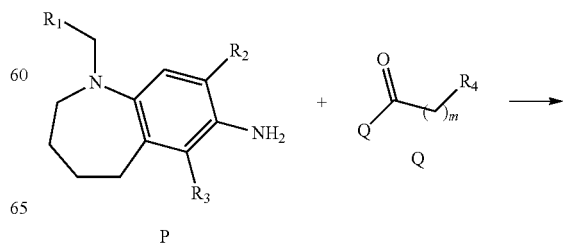

-continued

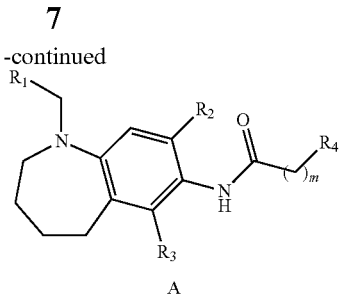

A reacting a compound of formula P with a compound of formula Q to obtain a compound of formula A;

wherein, $R_1$, $R_2$, $R_3$, $R_4$ and m are as described in the first aspect of the invention;

Q is selected from the group consisting of halogen and hydroxyl.

In the third aspect of the invention, a pharmaceutical composition comprising one or more pharmaceutically acceptable carriers and one or more compounds or a pharmaceutically acceptable salt thereof according to the first aspect of the present invention is provided.

In the fourth aspect of the invention, a use of the compound according to the first aspect of the present invention or a pharmaceutically acceptable salt thereof for the preparation of a medicament is provided, and the medicament is used for:

1) preventing and/or treating diseases related to potassium ion channels;

2) regulating (for example, upregulating or downregulating) ion flow in the potassium channels of mammals; and/or 3) preventing, treating and/or inhibiting disorders or conditions that respond to abnormalities (for example, increase or decrease) of ion current in potassium channels.

In another preferred embodiment, the medicament is used to prevent and/or treat a disorder or condition selected from the group consisting of a disorder or condition of the central nervous system, pain, stroke, neurodegenerative disorder and neuronal hyperexcited state.

In another preferred embodiment, the disorder or condition of the central nervous system is epileptic seizure disease.

In another preferred embodiment, the pain is selected from the group consisting of inflammatory pain, neurological pain, migraine pain, allodynia, hyperalgesic pain, phantom pain, and cancer-related pain.

In another preferred embodiment, the neurodegenerative disorder is selected from the group consisting of Alzheimer's disease, huntington's disease, multiple sclerosis, amyotrophic lateral sclerosis, AIDS-induced encephalopathy and other infection-related encephalopathy caused by rubella virus, herpes virus, Borrelia and/or unknown pathogens, Creutzfeld-Jakob disease, Parkinsons disease and trauma-induced neurodegeneration.

In another preferred embodiment, the neuronal hyperexcited state is a drug withdrawal or poisoning state.

In another preferred embodiment, the epileptic seizure disease is selected from the group consisting of convulsions, epilepsy, and status epilepticus.

In another preferred embodiment, the neurological pain is a neurological pain associated with diabetic neuropathy or neurological pain associated with migraine.

In the fifth aspect of the invention, it provides a potassium ion channel regulator, comprising one or more of the compounds described in the first aspect of the present invention or pharmaceutically acceptable salts thereof.

In another preferred embodiment, the potassium ion channel regulator is a potassium ion channel opener.

In the sixth aspect of the present invention, it provides a method for the prevention and/or treatment of a disease associated with a potassium ion channel, comprising administering to the subject in need thereof a preventive and/or therapeutically effective amount of the compound according to the first aspect of the present invention or its pharmaceutically acceptable salt or the pharmaceutical composition according to the third aspect of the present invention.

In another preferred embodiment, the disease related to potassium ion channel is selected from the group consisting of a disorder or condition of the central nervous system, pain, stroke, neurodegenerative disorder and neuronal hyperexcited state.

It should be understood that in the present invention, any of the technical features specifically described above and below (such as in the Examples) can be combined with each other, which will not redundantly be described one by one herein.

DETAILED DESCRIPTION OF THE INVENTION

After long-term and in-depth research, the inventors unexpectedly prepared a compound of formula A with excellent potassium channel opening activity, pharmacokinetics (such as cerebral blood ratio performance, etc.), safety and novel structure through structural optimization. On this basis, the inventors have completed the present invention.

TERMS

In the present invention, unless specifically indicated, the terms used have the general meaning well known to those skilled in the art.

In the present invention, the term "halogen" refers to F, Cl, Br or I.

In the present invention, "$C_{1-6}$ alkyl" refers to a straight or branched alkyl including 1-6 carbon atoms, such as methyl, ethyl, propyl, isopropyl, butyl, isobutyl, tert-butyl, neopentyl, tert-pentyl, or similar groups.

In the present invention, the term "$C_{2-6}$ alkenyl" refers to a straight or branched chain alkenyl having 2 to 6 carbon atoms and containing a double bond, including but not limited to vinyl, propenyl, butenyl, isobutenyl, pentenyl and hexenyl etc.

In the present invention, the term "$C_{2-6}$ alkynyl" refers to a straight or branched alkynyl having 2 to 6 carbon atoms and containing a triple bond, including but not limited to ethynyl, propynyl, butynyl, isobutynyl, pentynyl and hexynyl, etc.

In the present invention, the term "$C_{3-6}$ cycloalkyl" refers to a cyclic alkyl having 3 to 6 carbon atoms in the ring, including but not limited to cyclopropyl, cyclobutyl, cyclopentyl, cyclohexyl etc.

In the present invention, the term "$C_{1-6}$ alkoxy" refers to a straight or branched alkoxy having 1 to 6 carbon atoms, including but not limited to methoxy, ethoxy, propoxy, isopropoxy and butoxy, etc. It is preferably a $C_{1-4}$ alkoxy.

In the present invention, the term "aromatic ring" or "aryl" has the same meaning, preferably is "$C_{6-10}$ aryl". The term "$C_{6-10}$ aryl" refers to an aromatic ring group having 6 to 10 carbon atoms in the ring that does not contain heteroatoms, such as phenyl, naphthyl and the like.

In the present invention, the term "aromatic heterocycle" or "heteroaryl" has the same meaning and refers to a heteroaromatic group containing one to more heteroatoms. For example, "4-7 membered heteroaryl containing 1-3 heteroatoms selected from N, O or S" means an aromatic heterocycle containing 1 to 3 heteroatoms selected from N, O or S and 1-6 carbon atoms. Non-limiting examples include: furyl, thienyl, pyridyl, pyrazolyl, pyrrolyl, N-alkylpyrrolyl, pyrimidinyl, pyrazinyl, imidazolyl, tetrazolyl and the like. The heteroaryl ring may be fused to an aryl, heterocyclic or cycloalkyl ring, wherein the ring connected to the parent structure is a heteroaryl ring. Heteroaryl groups can be optionally substituted or unsubstituted.

In the present invention, the term "$C_{1-6}$ alkylamine" refers to a group having a structure of $C_{1-6}$ alkyl-NH—.

In the present invention, the term "halogenated" means substituted by halogen.

In the present invention, the term "substituted" means that one or more hydrogen atoms on a specific group are replaced with a specific substituent. The specific substituents are the substituents described correspondingly in the foregoing, or the substituents appearing in the respective embodiments. Unless otherwise specified, a substituted group may have a substituent selected from a specific group at any substitutable position of the group, and the substituent may be the same or different at each position. Those skilled in the art will understand that the combinations of substituents contemplated by the present invention are those that are stable or chemically achievable. The substituent, for example, (but is not limited to): halogen, nitro, cyano, hydroxy, carboxy (—COOH), C1-C6 alkyl, C2-C6 alkenyl, C2-C6 alkynyl, C3-C8 cycloalkyl, 3 to 12 membered heterocyclyl, aryl, heteroaryl, C1-C8 aldehyde group, C2-C10 acyl, C2-C10 ester, amino, C1-C6 alkoxy, C1-C10 sulfonyl group, etc.

In the present invention, the term "multiple" or "more" includes (but is not limited to) 2, 3, 4, 5, 6, 7, 8, 9, 10.

Compound

The compounds of the invention refer to the compound of formula A or a stereoisomer or an optical isomer thereof, or a pharmaceutically acceptable salt thereof.

In another preferred embodiment, in the compound, any one of $R_1$, $R_2$, $R_3$, $R_4$ and m is a corresponding group in the specific compound prepared in Examples 1-8.

Unless otherwise specified, in all compounds of the invention, each chiral carbon atom (chiral center) may optionally be R configuration or S configuration, or a mixture of R configuration and S configuration.

As used herein, when alone or as part of other substituents, the term "alkyl" refers to a straight chain (i.e., unbranched) or a branched saturated hydrocarbon group containing only carbon atoms, or a combination of straight and branched chains. When the alkyl has a limited number of carbon atoms in front of it (such as $C_{1-6}$ alkyl), it means that the alkyl contains 1-6 carbon atoms, including for example methyl, ethyl, propyl, isopropyl, butyl, isobutyl, sec-butyl, tert-butyl, or similar groups.

As used herein, when alone or as part of other substituents, the term "$C_{1-6}$ alkoxy" refers to $C_{1-6}$ alkyl-O—, including for example methoxy, ethoxy, propoxy, isopropoxy, butoxy, isobutoxy, sec-butoxy, tert-butoxy, or similar groups.

As used herein, when alone or as part of other substituents, the term "$C_{3-6}$ cycloalkyl" refers to a cyclic alkyl having 3-6 carbon atoms, including for example cyclopropyl, cyclobutyl, cyclopentyl, cyclohexyl, or similar groups.

As used herein, when alone or as part of other substituents, the term "$C_{3-6}$ cycloalkenyl" refers to a cyclic alkenyl having 3-6 carbon atoms, which may have one or two alkenyl, including for example cyclobutenyl, cyclopentenyl, cyclohexenyl, or similar groups.

As used herein, when alone or as part of other substituents, the term "$C_{2-6}$ alkenyl" refers to a straight or branched chain alkenyl having 3-6 carbon atoms, which may have one or more alkenyl, including for example vinyl, propenyl, butenyl, or similar groups.

As used herein, when alone or as part of other substituents, the term "$C_{2-6}$ alkynyl" refers to a straight or unbranched chain alkynyl having 2-6 carbon atoms, which may have one or more alkynyl, including for example ethynyl, propynyl, butynyl, or similar groups.

The compound of the invention has better potassium ion channel opening activity, ideal ion channel selectivity, ideal pharmacokinetic properties, excellent safety and better efficacy in vivo, and can be used for the treatment of diseases such as pain, epilepsy, and stroke.

As used herein, the term "pharmaceutically acceptable salt" refers to a salt formed by a compound of the present invention and an acid or base suitable for use as a medicine. Pharmaceutically acceptable salts include inorganic salts and organic salts. A preferred class of salts is the salts of the compounds of the invention formed with acids. Acids suitable for salt formation include, but are not limited to hydrochloric acid, hydrobromic acid, hydrofluoric acid, sulfuric acid, nitric acid, phosphoric acid and other inorganic acids; formic acid, acetic acid, trifluoroacetic acid, propionic acid, oxalic acid, malonic acid, succinic acid, fumaric acid, maleic acid, lactic acid, malic acid, tartaric acid, citric acid, picric acid, salicylic acid, benzoic acid, methanesulfonic acid, ethanesulfonic acid, p-toluenesulfonic acid, benzenesulfonic acid, naphthalenesulfonic acid, butanedioic acid, naphthalenedisulfonic acid (1,5), asiatic acid, valeric acid, diethyl acetic acid, malonic acid, pimelic acid, adipic acid, sulfamic acid, phenylpropionic acid, gluconic acid, ascorbic acid, niacin, isonicotinic acid and other organic acids; and proline, phenylalanine, aspartic acid, glutamic acid and other amino acids.

Another preferred class of salts are salts of the compounds of the invention formed with bases, such as alkali metal salts (for example sodium or potassium salts), alkaline earth metal salts (for example magnesium or calcium salts), ammonium salts (such as lower grades alkanol ammonium salts and other pharmaceutically acceptable amine salts), such as methylamine salt, ethylamine salt, propylamine salt, dimethylamine salt, trimethylamine salt, diethylamine salt, triethylamine salt, tert-butylamine salt, ethylenediamine salt, hydroxyethylamine salt, dihydroxyethylamine salt, trishydroxyethylamine salt, and an amine salt formed by morpholine, piperazine, and lysine, respectively.

The "stereoisomer" or "optical isomer" means that the chiral carbon atoms involved in the present invention may be an R configuration, or may be an S configuration, or a combination thereof.

PREPARATION METHOD

The preparation method of the compound of formula A according to the present invention is more specifically described below, but these specific methods do not constitute any limitation. The compounds of the present invention may also be conveniently prepared by optionally combining various synthetic methods described in the specification or known in the art, and such combinations are readily made by those skilled in the art to which the present invention pertains.

Typically, the preparation process of the compounds of the present invention is as follows, wherein the starting materials and reagents used are commercially available unless otherwise specified.

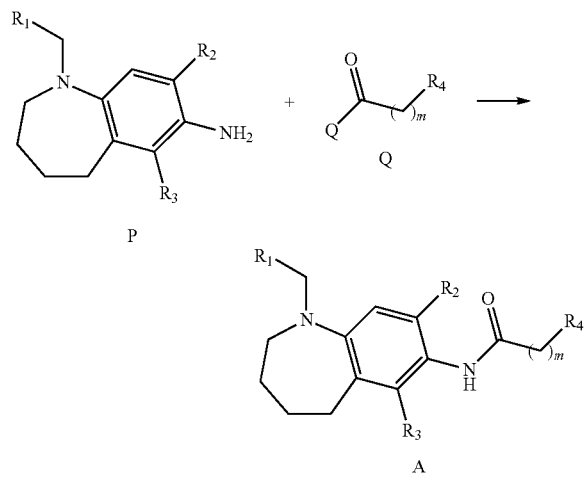

reacting a compound of formula P with a compound of formula Q to obtain a compound of formula A;

wherein, $R_1$, $R_2$, $R_3$, $R_4$ and m are as described above;

Q is selected from the group consisting of halogen and hydroxyl.

Pharmaceutical Composition and Method for Administration

Because the compound of the present invention has excellent KCNQ2/3 opening activity, the compound of the present invention and the pharmaceutical composition containing the compound of the present invention as the main active ingredient can be used to treat, prevent and alleviate diseases related to potassium ion channels. According to the prior art, the compounds of the invention can be used to treat the following diseases (but not limited to): epilepsy, inflammatory pain, neurological pain, migraine, insomnia, neurodegenerative disease, anxiety disorder, stroke, cocaine abuse, nicotine withdrawal, alcohol withdrawal or tinnitus, etc.

The pharmaceutical composition of the present invention comprises a safe and effective amount of a compound of the present invention or a pharmacologically acceptable salt thereof, and a pharmacologically acceptable excipient or carrier. The "safe and effective amount" refers to: the amount of the compound is sufficient to significantly improve the condition without causing serious side effects. Generally, the pharmaceutical composition contains 1-2000 mg of the compound of the present invention/agent, more preferably, 5-200 mg of the compound of the present invention/agent. Preferably, the "agent" is a capsule or tablet.

The "pharmaceutically acceptable carrier" means one or more compatible solid or liquid fillers or gelatinous materials which are suitable for human use and should be of sufficient purity and sufficiently low toxicity. "Compatibility" means that each component in the composition can be admixed with the compounds of the present invention and with each other without significantly reducing the efficacy of the compounds. Some examples of pharmaceutically acceptable carriers include cellulose and the derivatives thereof (such as sodium carboxymethyl cellulose, sodium ethyl cellulose, cellulose acetate, etc.), gelatin, talc, solid lubricants (such as stearic acid, magnesium stearate), calcium sulfate, vegetable oils (such as soybean oil, sesame oil, peanut oil, olive oil, etc.), polyols (such as propylene glycol, glycerol, mannitol, sorbitol, etc.), emulsifiers (such as Tween®), wetting agent (such as sodium dodecyl sulfate), coloring agents, flavoring agents, stabilizers, antioxidants, preservatives, pyrogen-free water, etc.

The pharmaceutical composition is an injection, a capsule, a tablet, a pill, a powder, or a granule.

The administration mode of the compound or pharmaceutical composition of the present invention is not particularly limited, and representative administration modes include, but are not limited to oral, rectal, parenteral (intravenous, intramuscular or subcutaneous) and topical administration.

Solid dosage forms for oral administration include capsules, tablets, pills, powders and granules. In these solid dosage forms, the active ingredient is mixed with at least one conventional inert excipient (or carrier), such as sodium citrate or dicalcium phosphate, or mixed with any of the following components: (a) fillers or compatibilizer, for example, starch, lactose, sucrose, glucose, mannitol and silicic acid; (b) binders, for example, hydroxymethyl cellulose, alginate, gelatin, polyvinylpyrrolidone, sucrose and arabic gum; (c) humectants, for example, glycerol; (d) disintegrating agents, for example, agar, calcium carbonate, potato starch or tapioca starch, alginic acid, certain composite silicates, and sodium carbonate; (e) slow-dissolving agents, for example, wax, (f) absorption accelerators, for example, quaternary ammonium compound; (g) wetting agents, for example, cetyl alcohol and glyceryl monostearate; (h) adsorbents, for example, kaolin; and (i) lubricants, for example, talc, calcium stearate, magnesium stearate, solid polyethylene glycol, sodium dodecyl sulfate or mixture thereof. In capsules, tablets and pills, the dosage forms may also contain buffering agents.

Solid dosage forms such as tablets, dragees, capsules, pills and granules can be prepared with coatings and shells such as enteric coatings and other materials known in the art. They may contain opacifying agents and the release of the active compound or compound in such compositions may be released in a portion of the digestive tract in a delayed manner. Examples of embedding components that can be employed are polymeric materials and waxy materials. If necessary, the active compound may also be in microencapsulated form with one or more of the above-mentioned excipients.

Liquid dosage forms for oral administration include pharmaceutically acceptable emulsions, solutions, suspensions, syrups or tinctures. In addition to the active compound, the liquid dosage form may contain inert diluents conventionally used in the art, such as water or other solvents, solubilizers and emulsifiers, for example, ethanol, isopropanol, ethyl carbonate, ethyl acetate, propylene glycol, 1,3-butanediol, dimethylformamide and oils, especially cottonseed oil, peanut oil, corn germ oil, olive oil, castor oil and sesame oil or mixtures of these substances.

In addition to these inert diluents, the compositions may contain adjuvants such as wetting agents, emulsifying and suspending agents, sweetening agents, flavoring agents and spices.

In addition to the active compound, the suspension may contain suspending agent, for example, ethoxylated isooctadecanol, polyoxyethylene sorbitol and dehydrated sorbitan ester, microcrystalline cellulose, aluminum methoxide and agar, or the mixture thereof etc.

The compositions for parenteral injection may comprise physiologically acceptable sterile aqueous or anhydrous solutions, dispersions, suspensions or emulsions, and sterile powders which can be re-dissolved into sterile injectable solutions or dispersions. Suitable aqueous and non-aqueous carriers, diluents, solvents or excipients include water, ethanol, polyols and any suitable mixtures thereof. Dosage forms for the compounds of the invention for topical administration include ointments, powders, patches, propellants and inhalants. The active ingredient is mixed under sterile conditions with a physiologically acceptable carrier and any preservatives, buffers, or propellants which may be required if necessary.

The compounds of the invention may be administered alone or in combination with other pharmaceutically acceptable compounds.

When the pharmaceutical composition is used, a safe and effective amount of the compound of the present invention is applied to a mammal (such as a human) in need of treatment, wherein the dosage at the time of administration is the pharmaceutically effective dosage, for people having a body weight of 60 kg, the daily dose is usually 1~2000 mg, preferably 5~500 mg. Of course, specific doses should also consider factors such as the administration route, the health condition of the patient, etc., which are within the skill of the skilled physician.

Compared with the prior art, the present invention has the following main advantages:

(1) The compound has better pharmacokinetics properties, such as better cerebral blood ratio performance;

(2) The compound has better potassium ion channel opening activity, better ion channel selectivity, better pharmacokinetic properties, excellent efficacy in vivo and better safety;

(3) The compounds are expected to be used in the treatment and/or prevention of diseases and disorders affected by the activity of potassium ion channels.

The present invention will be further illustrated below with reference to the specific examples. It should be understood that these examples are only to illustrate the invention but not to limit the scope of the invention. Experimental methods in which the specific conditions are not specified in the following examples are usually in accordance with conventional conditions such as the conditions described in Sambrook et al., Molecular Cloning: Laboratory Manual (New York: Cold Spring Harbor Laboratory Press, 1989), or in accordance with the conditions recommended by the manufacturer. Unless indicated otherwise, parts and percentage are calculated by weight.

Unless otherwise defined, all professional and scientific terminology used in the text have the same meanings as known to the skilled in the art. In addition, any methods and materials similar or equal with the record content can apply to the methods of the invention. The method of the preferred embodiment described herein and the material are only for demonstration purposes.

The experimental materials and reagents used in the following examples can be obtained from commercial sources unless otherwise specified.

EXAMPLE 1 PREPARATION OF COMPOUND A1

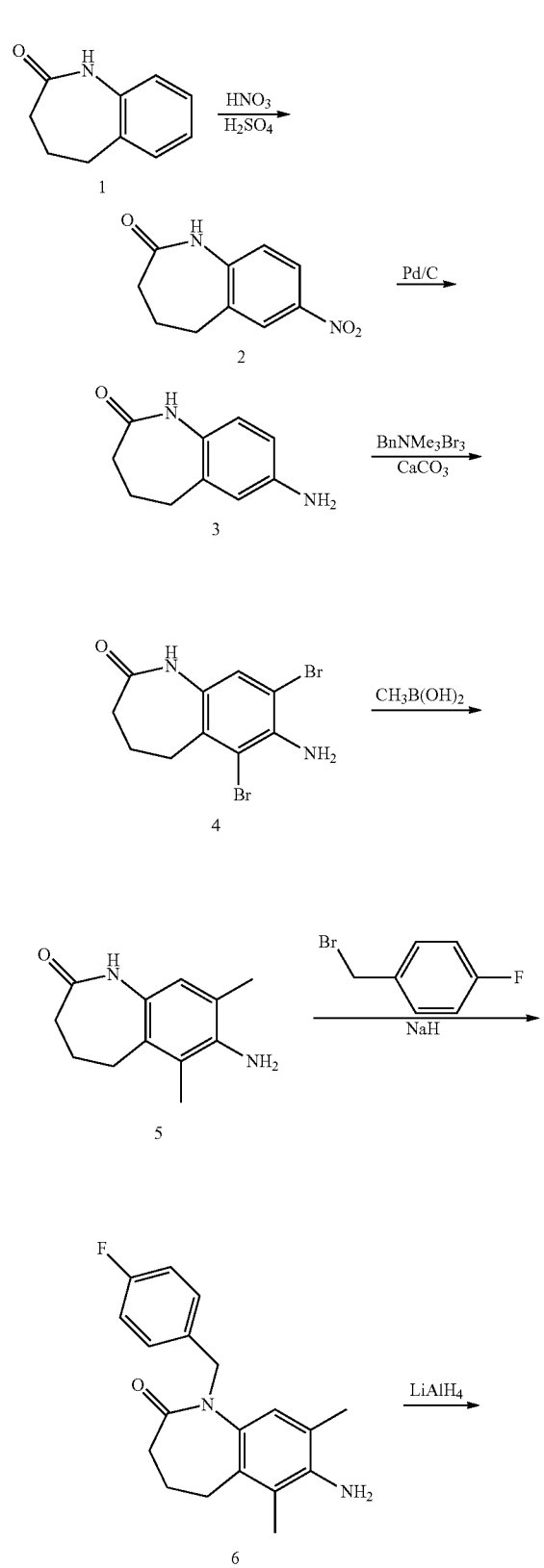

15
-continued

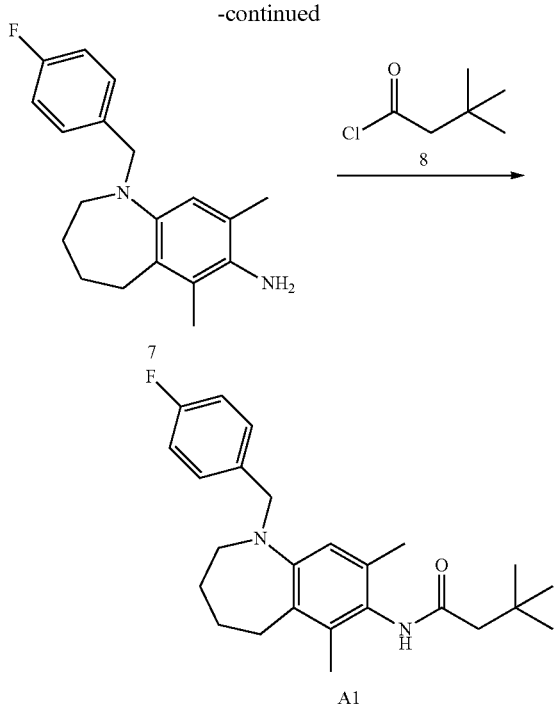

Step 1:
7-nitro-1,3,4,5-tetrahydro-2H-1-benzazepine-2-one (Compound 2)

At 0° C., concentrated $HNO_3$ (4 mL) and concentrated $H_2SO_4$ (40 mL) were evenly mixed, and then 1,3,4,5-tetrahydro-2H-1-benzazepine-2-one (4.0 g, 0.024 mol) was slowly added, the reaction mixture were reacted at 0° C. for 20 minutes, and then poured into ice water after the reaction was completed, solid was precipitated, filtered, dried to give a crude white solid compound 2 (5.6 g).

MS (ESI): Calcd. for $C_{10}H_{10}N_2O_3$ 206; Found 207 $[M+H]^+$.

Step 2:
7-amino-1,3,4,5-tetrahydro-2H-1-benzazepine-2-one (Compound 3)

Palladium on carbon(1.5 g, 0.014 mol) was added to a solution of compound 2 (5.0 g, 0.024 mol) in ethanol (100 mL), and the mixture was stirred at room temperature overnight under the protection of hydrogen. The palladium on carbon was removed by filtration, and the solvent was removed by concentration, the residue was purified by column chromatography to obtain a compound 3 (2.5 g, yield: 59%).

MS (ESI): Calcd. for $C_{10}H_{12}N_2O$ 176; Found 177 $[M+H]^+$.

Step 3: 7-amino-6,8-dibromo-1,3,4,5-tetrahydro-2H-1-benzazepine-2-one (Compound 4)

Compound 3 (500 mg, 2.8 mmol), methanol (20 mL), dichloromethane (50 mL), benzyltrimethylammonium tribromide (2.2 g, 5.6 mmol) and calcium carbonate (2.5 g, 7.06 mmol) were added to 100 mL eggplant-shaped flask, the mixture was reacted at room temperature for 30 minutes, then filtered, concentrated to remove the solvent, and the residue was purified by column chromatography to obtain compound 4 (900 mg, yield: 95%).

MS (ESI): Calcd. for $C_{10}H_{10}Br_2N_2O$ 332; Found 333 $[M+H]^+$.

Step 4: 7-amino-6,8-dimethyl-1,3,4,5-tetrahydro-2H-1-benzazepine-2-one (Compound 5)

Compound 4 (660 mg, 1.97 mmol), 1,4-dioxane (50 mL), methyl boric acid (450 mg, 8.8 mmol) and potassium carbonate (800 mg, 5.8 mmol) were added to 100 mL of three-neck flask, replaced with nitrogen for three times, then tetrakis (triphenylphosphine) palladium (450 mg, 0.38 mmol) was added, and the reaction mixture was reacted overnight at 120° C., then filtered, concentrated to remove the solvent, and the residue was purified by column chromatography to obtain a crude compound 5 (600 mg).

MS (ESI): Calcd. for $C_{12}H_{16}N_2O$ 204; Found 205 $[M+H]^+$.

Step 5: 7-amino-1-(4-fluorobenzyl)-6,8-dimethyl-1,3,4,5-tetrahydro-2H-1-benzazepine-2-one (Compound 6)

At 0° C., sodium hydride (70 mg, 2.9 mmol) was added to a solution of compound 5 (500 mmol, 2.4 mmol) in tetrahydrofuran (50 mL), and the mixture was stirred at room temperature under the protection of nitrogen for 10 minutes, and then 1-(bromomethyl)-4-fluorobenzene (460 mg, 2.4 mmol) was added. The reaction mixture was stirred at room temperature for 1 hour, then an appropriate amount of ice and ethyl acetate were added, extracted, dried, concentrated to remove the solvent, and the residue was purified by column chromatography to obtain compound 6 (350 mg, yield: 45.9%).

MS (ESI): Calcd. for $C_{19}H_{21}FN_2O$ 312; Found 313 $[M+H]^+$.

Step 6: 1-(4-fluorobenzyl)-6,8-dimethyl-2,3,4,5-tetrahydro-1H-benzazepine-7-amine (Compound 7)

At 0° C., compound 6 (350 mg, 1.12 mmol) was slowly added to a solution of lithium aluminum hydride (128 mg, 3.36 mmol) in tetrahydrofuran (20 mL). The mixture was heated to 70° C. and stirred for 1 hour, cooled to room temperature, and then ice water (0.13 mL) was slowly added, extracted with ethyl acetate (50 mL*3). The extracted solution was added with sufficient anhydrous magnesium sulfate, filtered and concentrated, the residue was purified by column chromatography to obtain compound 7 (275 mg, yield: 82.3%).

MS (ESI): Calcd. for $C_{19}H_{23}FN_2$ 298; Found 299 $[M+H]^+$.

Step 7: N-(1-(4-fluorobenzyl)-6,8-dimethyl-2,3,4,5-tetrahydro-1H-benzazepine-7-yl)-3,3-dimethylbutanamide (Compound A1)

3,3-dimethylbutyryl chloride (147 mg, 1.09 mmol) and triethylamine (183 mg, 1.8 mmol) were added to a solution of compound 7 (270 mg, 0.9 mmol) in dichloromethane (30 mL), the mixture was stirred at room temperature for 1 hour. Water and ethyl acetate were added, extracted, dried to remove moisture, concentrated to remove the solvent, a small amount of solvent (petroleum ether:ethyl acetate=3.5:1) was added into the residue, heated under 50° C., filtered while hot, the filtered cake was dried to give Compound A1 (97 mg, yield: 27%).

MS (ESI): Calcd. for $C_{25}H_{33}FN_2O$ 396; Found 397 $[M+H]^+$.

HNMR (400 MHz, $CD_3OD$): δ 7.46-7.40 (m, 2H), 7.07-6.99 (m, 2H), 6.76 (s, 1H), 4.27 (s, 2H), 2.98-2.93 (m, 2H), 2.90-2.83 (m, 2H), 2.32 (s, 2H), 2.20 (s, 3H), 2.16 (s, 3H), 1.65-1.52 (m, 4H), 1.15 (s, 9H).

EXAMPLE 2 PREPARATION OF COMPOUND A2

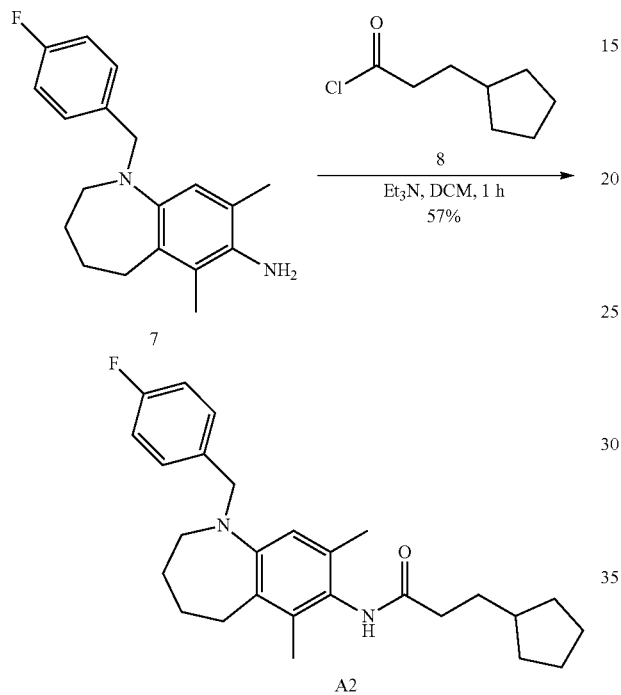

3-cyclopentyl-N-(1-(4-fluorobenzyl)-6,8-dimethyl-2,3,4,5-tetrahydro-1H-benzazepine-7-yl)propionamide (Compound A2)

3-cyclopentyl propionyl chloride (161.5 mmol, 1.01 mmol, 1.5 eq.) and triethylamine (135.6 mg, 1.34 mmol, 2.0 eq.) were added to a solution of compound 7 (200 mg, 0.67 mmol, 1.0 eq.) in dichloromethane (20 mL), the mixture was stirred at room temperature for 0.5 hours. TLC monitored until the reaction was completed (petroleum ether:ethyl acetate=2:1). 100 mL of dichloromethane was added into the reaction mixture, washed with pure water (30 mL*3). The organic phase was dried over anhydrous sodium sulfate to remove water, concentrated to remove the solvent, and the residue was purified by column chromatography (PE/EA=100/1 to 2:1) to obtain a white solid Compound A2 (161 mg, 57% yield).

LCMS: $[M+H]^+$=423.2.

$^1$H NMR (400 MHz, DMSO) δ 8.97 (s, 1H), 7.43 (dd, 5.7 Hz, 2H), 7.14 (t, 2H), 6.69 (s, 1H), 4.23 (s, 2H), 2.67 (m, 4H), 2.27 (m, 2H), 2.02 (s, 3H), 2.05 (s, 3H), 1.82-1.72 (m, 3H), 1.65-1.55 (m, 4H), 1.55-1.42 (m, 6H), 1.18-1.03 (m, 2H).

EXAMPLE 3 PREPARATION OF COMPOUND A3

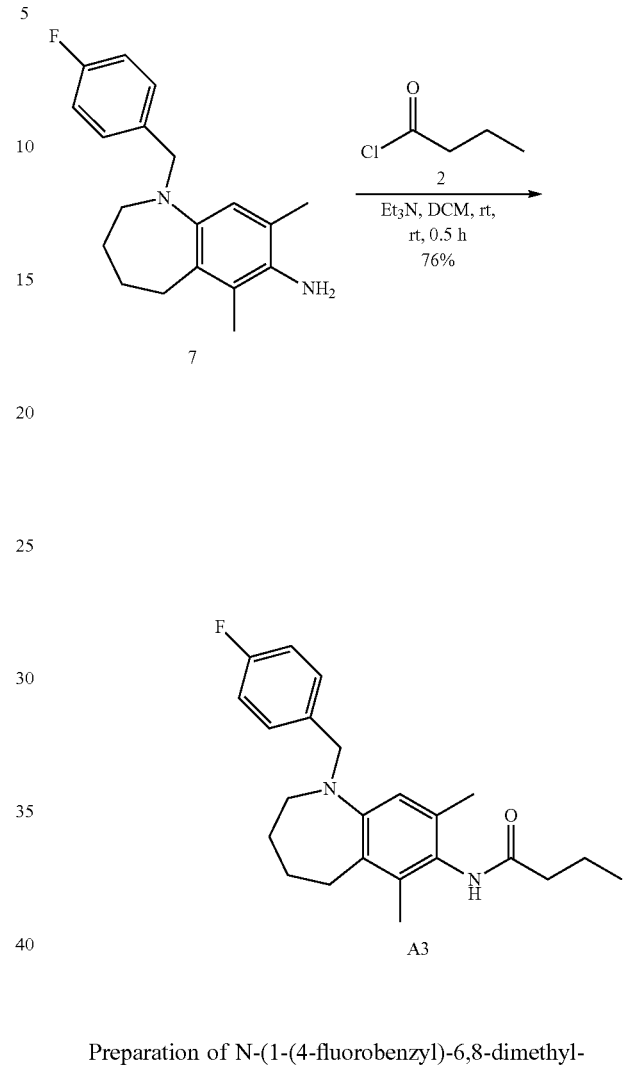

Preparation of N-(1-(4-fluorobenzyl)-6,8-dimethyl-2,3,4,5-tetrahydro-1H-benzazepine-7-yl)butanamide (Compound A3)

Butyryl chloride (107 mg, 1.007 mmol, 1.5 eq.) and triethylamine (170 mg, 1.678 mmol, 2.5 eq) were added into a solution of compound 7 (200 mg, 0.67 mmol, 1.0 eq.) in dichloromethane (20 mL), the mixture was stirred at room temperature for 0.5 hour. TLC monitored until the reaction was completed (petroleum ether:ethyl acetate=2:1). 20 mL of dichloromethane was added into the reaction mixture, and washed by pure water (30 mL*3). The organic phase was dried over anhydrous sodium sulfate to remove water, concentrated to remove the solvent, 15 mL of solvent (petroleum ether:ethyl acetate=10:1) was added to the residue and stirred at room temperature for 0.5 h, filtered, and the filtered cake was dried to obtain a white solid Compound A3 (188 mg, 76% yield).

LCMS: $[M+H]^+$=369.3

$^1$H NMR (400 MHz, DMSO-d6) δ 8.97 (s, 1H), 7.43 (dd, 2H), 7.19-7.08 (m, 2H), 6.70 (s, 1H), 4.24 (s, 2H), 2.82 (s, 4H), 2.30-2.20 (m, 2H), 2.04 (d, 6H), 1.70-1.55 (m, 2H), 1.50 (s, 4H), 0.94 (t, 3H).

EXAMPLE 4 PREPARATION OF COMPOUND A4

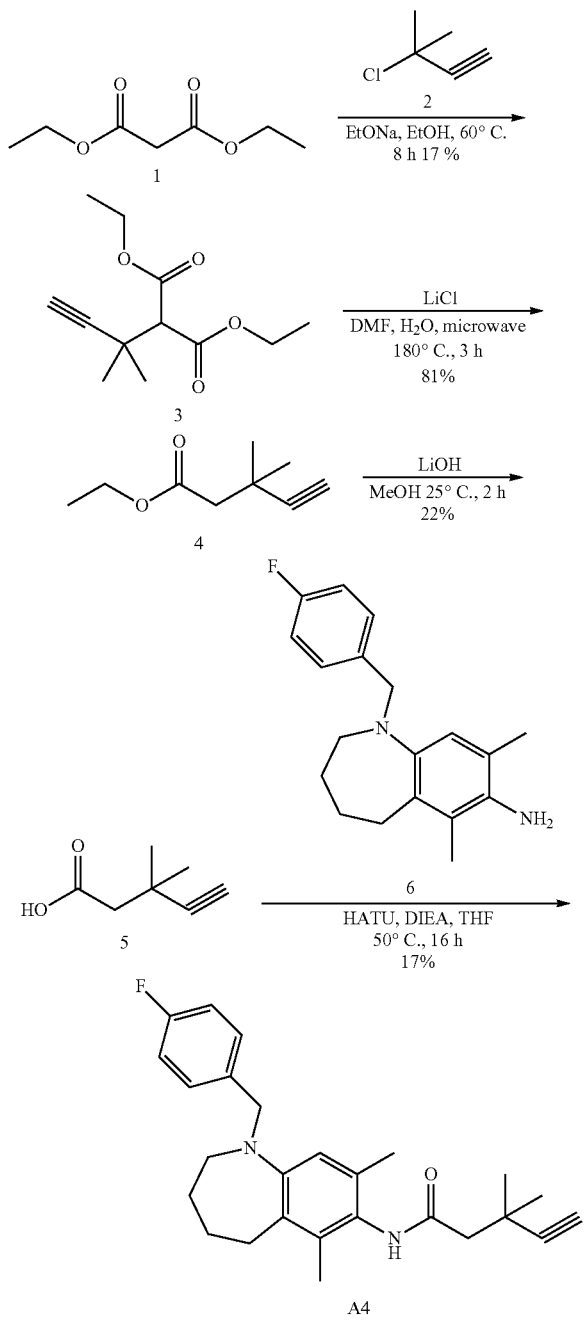

Step 1, 2-(2-methylbut-3-yn-2-yl) diethyl malonate (Compound 3)

Diethyl malonate 1 (10 g, 62.5 mmol), EtOH (100 mL), 3-chloro-3-methylbut-1-yne 2 (13 g, 125 mmol) and NaOEt (6.3 g, 93.7 mmol) were added into a 250 mL eggplant-shaped flask, the reaction solution was stirred at 60° C. for 8 hours. After the reaction was completed, pure water (100 mL) was added for quenching, and extracted with EA (150 mL×3). The combined organic layers were dried over Na$_2$SO$_4$, concentrated and purified by flash chromatography column (eluent PE/EA=100:5) to obtain 2-(2-methylbut-3-yn-2-yl)diethyl malonate 3 (2.5 g, 17%) as a yellow oil, LCMS: [M+H]$^+$=227.1

Step 2, ethyl 3,3-dimethylpent-4-ynoate (Compound 4)

2-(2-methylbut-3-yn-2-yl)diethyl malonate 3 (1.0 g, 4.4 mmol), LiCl (570 mg, 13.4 mmol), DMF (5 mL) and pure water (0.5 mL) were added to the microwave tube, reacted at 180° C. for 3 h under microwave, and after the reaction was completed, cooled to room temperature, the reaction liquid was poured into pure water (50 mL), extracted with ethyl acetate (50 mL*3), and the combined organic phases were concentrated to dryness to obtain ethyl 3,3-dimethyl-pent-4-ynoate (yellow oil, 4, 550 mg, 81%).

LCMS: [M+H]$^+$=155.1

Step 3, 3,3-dimethylpent-4-ynoic acid (Compound 5)

ethyl 3,3-dimethylpent-4-ynoate (4, 550 mg, 3.6 mmol), LiOH.H$_2$O (570 mg, 13.5 mmol), methanol (4 ml) and pure water (2 mL) were added to a 25 mL eggplant-shaped flask, stirred at 25° C. for 2 h. Most of the solvent was concentrated to be removed, and pure water (50 mL) was added, the aqueous phase was extracted with ethyl acetate (50 mL*3), the organic phases were combined. The organic phase was dried and purified by column chromatography (PE/EA=10:3) to obtain 3,3-dimethylpent-4-ynoic acid (compound 5, 100 mg, 22%), LCMS: [M+H]$^+$=127.1.

Step 4, N-(1-(4-fluorobenzyl)-6,8-dimethyl-2,3,4,5-tetrahydro-1H-benzazepine-7-yl)-3,3-dimethylpent-4-ynamide (Compound A4)

3,3-dimethylpent-4-ynoic acid (compound 5, 63 mg, 0.5 mmol), HATU (293 mg, 0.75 mmol), DIEA (193 mg, 1.5 mmol) and compound 6 (150 mg, 0.5 mmol) were added to 5 mL of THF, stirred, heated to 50° C. for 16 h. The reaction was completed, concentrated, purified by column chromatography (PE/EA=2:1) to obtain white solid N-(1-(4-fluorobenzyl)-6,8-dimethyl-2,3,4,5-tetrahydro-1H-benzazepine-7-yl)-3,3-dimethylpent-4-ynamide (Compound A4, 36 mg, 17%).

LCMS: [M+H]$^+$=407.1

1H NMR (400 MHz, DMSO-d6): δ 8.98 (s, 1H), 7.41 (dd, 2H), 7.12 (t, 2H), 6.68 (s, 1H), 4.22 (s, 2H), 2.95 (s, 1H), 2.81 (s, 4H), 2.43 (s, 2H), 2.05 (d, 6H), 1.49 (s, 4H), 1.32 (s, 6H).

EXAMPLE 5 PREPARATION OF COMPOUND A5

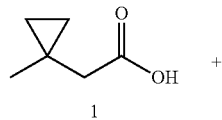

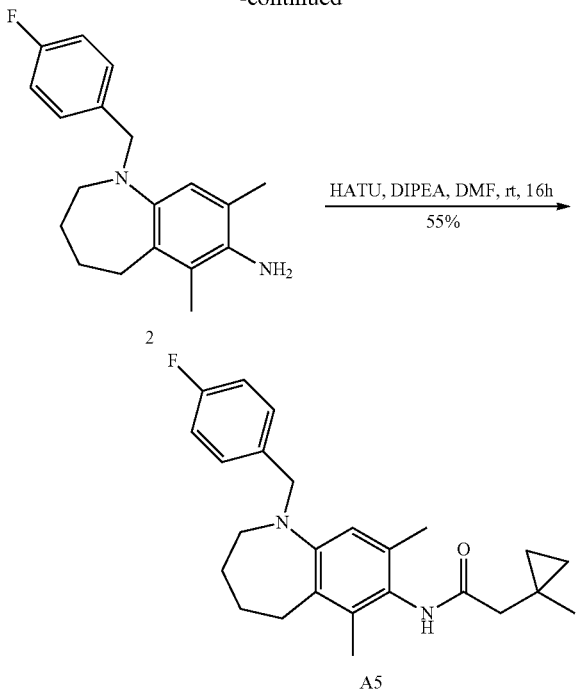

Refer to the synthesis method of Compound A4, a white solid N-(1-(4-fluorobenzyl)-6,8-dimethyl-2,3,4,5-tetrahydro-1H-benzazepine-7-yl)-2-(1-methylcyclopropyl)acetamide A5 (146 mg, 55%) was obtained.

LCMS: [M+H]⁺=395.3

¹H NMR (400 MHz, DMSO-d6): δ 8.85 (s, 1H), 7.43 (t, 2H), 7.14 (t, 2H), 6.71 (s, 1H), 4.24 (s, 2H), 2.83 (s, 4H), 2.18 (s, 2H), 2.08 (s, 3H), 2.05 (s, 3H), 1.51 (s, 4H), 1.14 (s, 3H), 0.54 (s, 2H), 0.31 (s, 2H).

EXAMPLE 6 PREPARATION OF COMPOUND A6

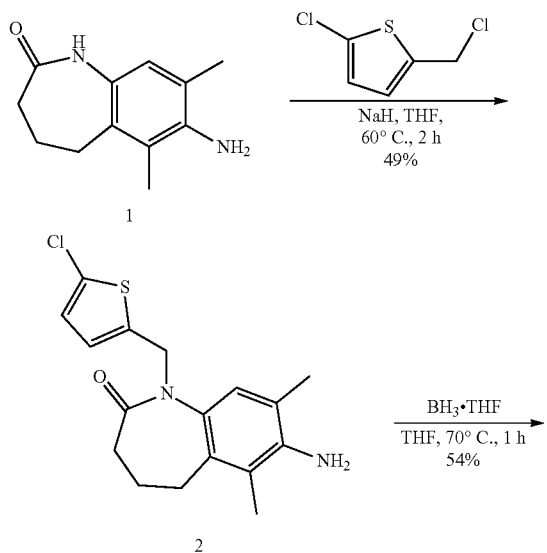

Refer to the synthesis method of 1-(4-fluorobenzyl)-6,8-dimethyl-2,3,4,5-tetrahydro-1H-benzazepine-7-amine (compound 7) in compound A1, compound 3 (1-(5-chlorothiophene-2-yl)methyl)-6,8-dimethyl-2,3,4,5-tetrahydro-1H-benzazepine-7-amine, 120 mg, 0.375 mmol, 54%) was obtained.

Refer to the synthesis method of Compound A1, a white solid N-(1-((5-chlorothiophene-2-yl)methyl)-6,8-dimethyl-2,3,4,5-tetrahydro-1H-benzazepine-7-yl)-3,3-dimethylbutamide (Compound A6, 98.6 mg, 0.236 mmol, 63%) was obtained.

¹H NMR (400 MHz, DMSO): δ 8.94 (s, 1H), 6.93 (s, 2H), 6.73 (s, 1H), 4.38 (s, 2H), 2.85-2.78 (m, 4H), 2.21 (s, 2H), 2.09 (d, 6H), 1.58-1.50 (m, 4H), 1.05 (s, 9H).

EXAMPLE 7 PREPARATION OF COMPOUND A7

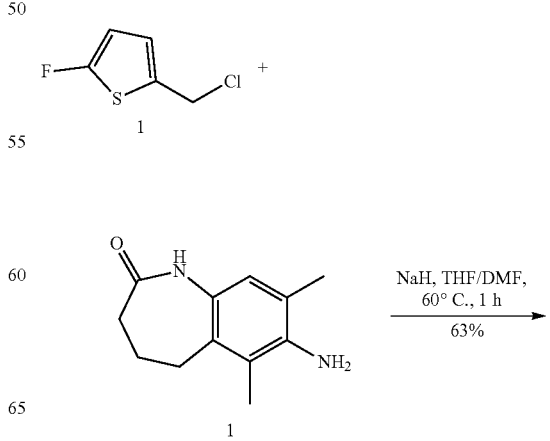

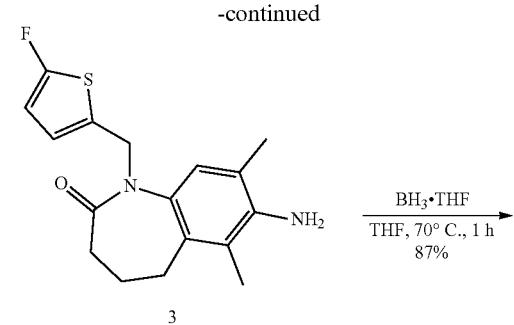

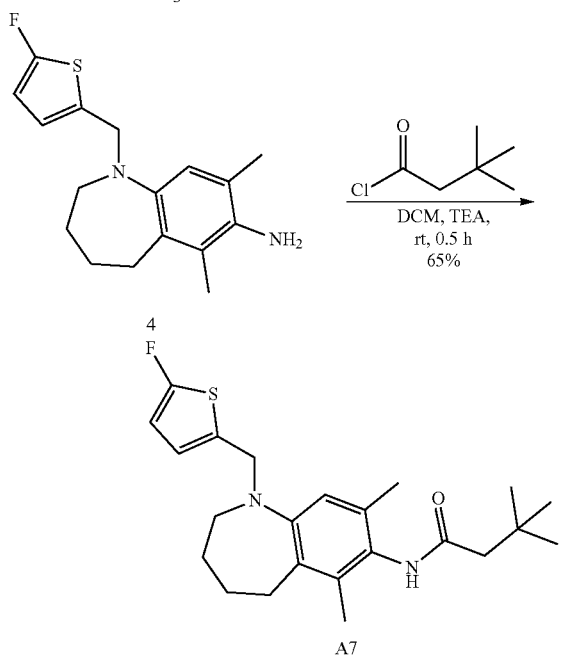

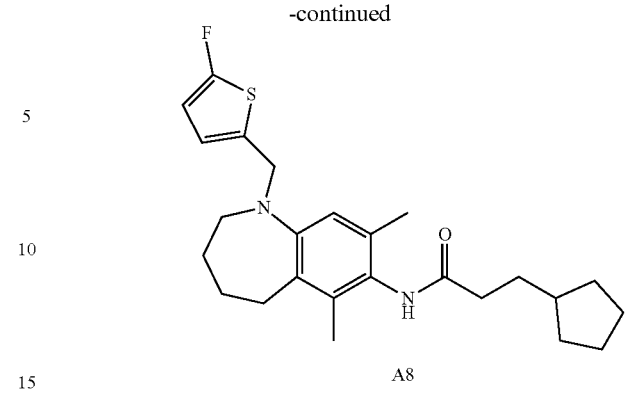

Refer to the synthesis method of Compound A6, a white solid 3-cyclopentyl-N-(1-((5-fluorothiophene-2-yl)methyl)-6,8-dimethyl-2,3,4,5-tetrahydro-1H-benzazepine-7-yl)propionamide (Compound A8, 99.4 mg, 70% yield) was obtained.

¹H NMR (400 MHz, DMSO) δ 9.01 (s, 1H), 6.75-6.72 (m, 2H), 6.52-6.50 (m, 1H), 4.32 (s, 2H), 2.92-2.73 (m, 4H), 2.35-2.25 (m, 2H), 2.05 (s, 6H), 1.79-1.75 (m, 3H), 1.62-1.49 (m, 10H), 1.12 (br, 2H).

EXAMPLE 9 PREPARATION OF COMPOUND A9

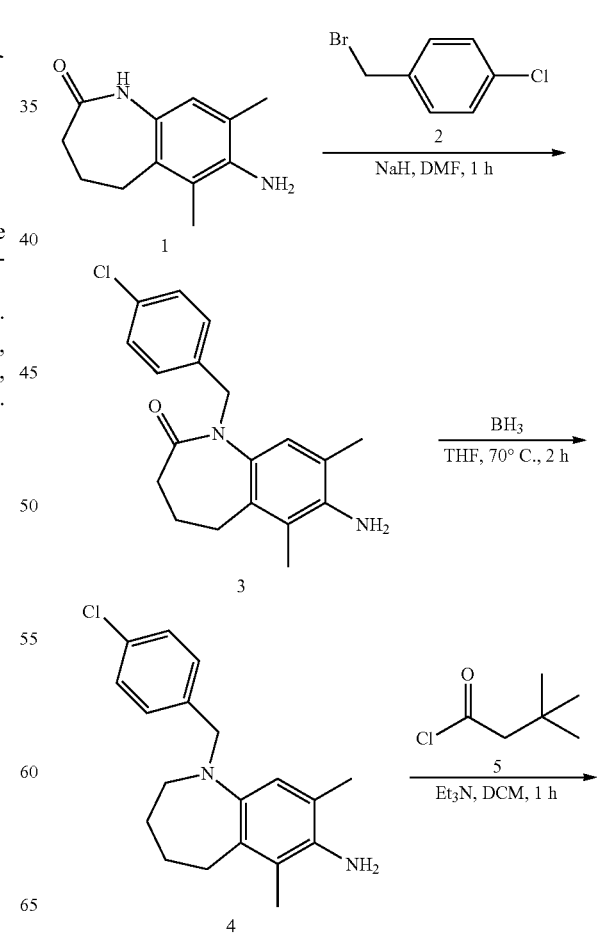

Refer to the synthesis method of Compound A6, a white solid N-(1-((5-fluorothiophene-2-yl)methyl)-6,8-dimethyl-2,3,4,5-tetrahydro-1H-benzazepine-7-yl)-3,3-dimethylbutamide (A7, 85.4 mg, 0.212 mmol, 65% yield) was obtained.

¹H NMR (400 MHz, DMSO) δ 8.95 (s, 1H), 6.80-6.69 (m, 2H), 6.52-6.50 (m, 1H), 4.32 (s, 2H), 2.91-2.74 (m, 4H), 2.19 (s, 2H), 2.07 (s, 6H), 1.57-1.49 (m, 4H), 1.05 (s, 9H).

EXAMPLE 8 PREPARATION OF COMPOUND A8

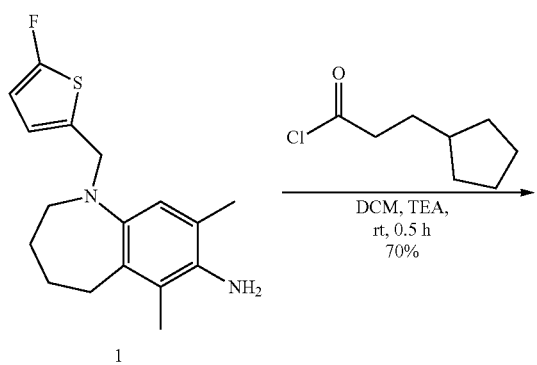

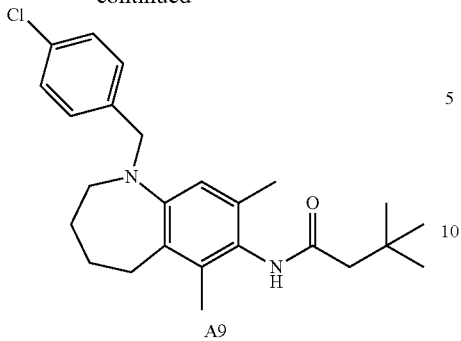

A9

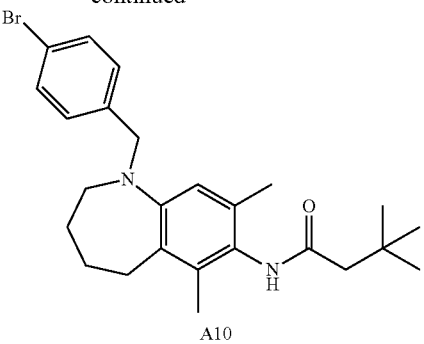

A10

Refer to the synthesis method of Compound A1, a white solid N-(1-(4-chlorobenzyl)-6,8-dimethyl-2,3,4,5-tetrahydro-1H-benzo[b]azepine-7-yl)-3,3-dimethylbutamide (Compound A9, 98.7 mg, 25% yield) was obtained.

LC-MS: [M+H]$^+$=413.2/415.2

$^1$H NMR (400 MHz, DMSO): δ 8.91 (s, 1H), 7.43-7.36 (m, 4H), 7.36 (d, J=8.2 Hz, 2H), 6.68 (s, 1H), 4.23 (s, 2H), 2.82 (s, 4H), 2.18 (s, 2H), 2.06 (s, 3H), 2.04 (s, 3H), 1.51 (s, 4H), 1.03 (s, 9H).

Refer to the synthesis method of Compound A1, a white solid N-(1-(4-bromobenzyl)-6,8-dimethyl-2,3,4,5-tetrahydro-1H-benzo[b]azaepine-7-yl)-3,3-dimethylbutamide (Compound A10, 223 mg, 58% yield) was obtained.

LC-MS: [M+H]$^+$=457.2/459.2

$^1$H NMR (400 MHz, DMSO): δ 8.92 (s, 1H), 7.51 (d, J=8.4 Hz, 2H), 7.36 (d, J=8.2 Hz, 2H), 6.68 (s, 1H), 4.23 (s, 2H), 2.82 (s, 4H), 2.18 (s, 2H), 2.08 (s, 3H), 2.06 (s, 3H), 1.51 (s, 4H), 1.03 (s, 9H).

EXAMPLE 10 PREPARATION OF COMPOUND A10

EXAMPLE 11 PREPARATION OF COMPOUND A11

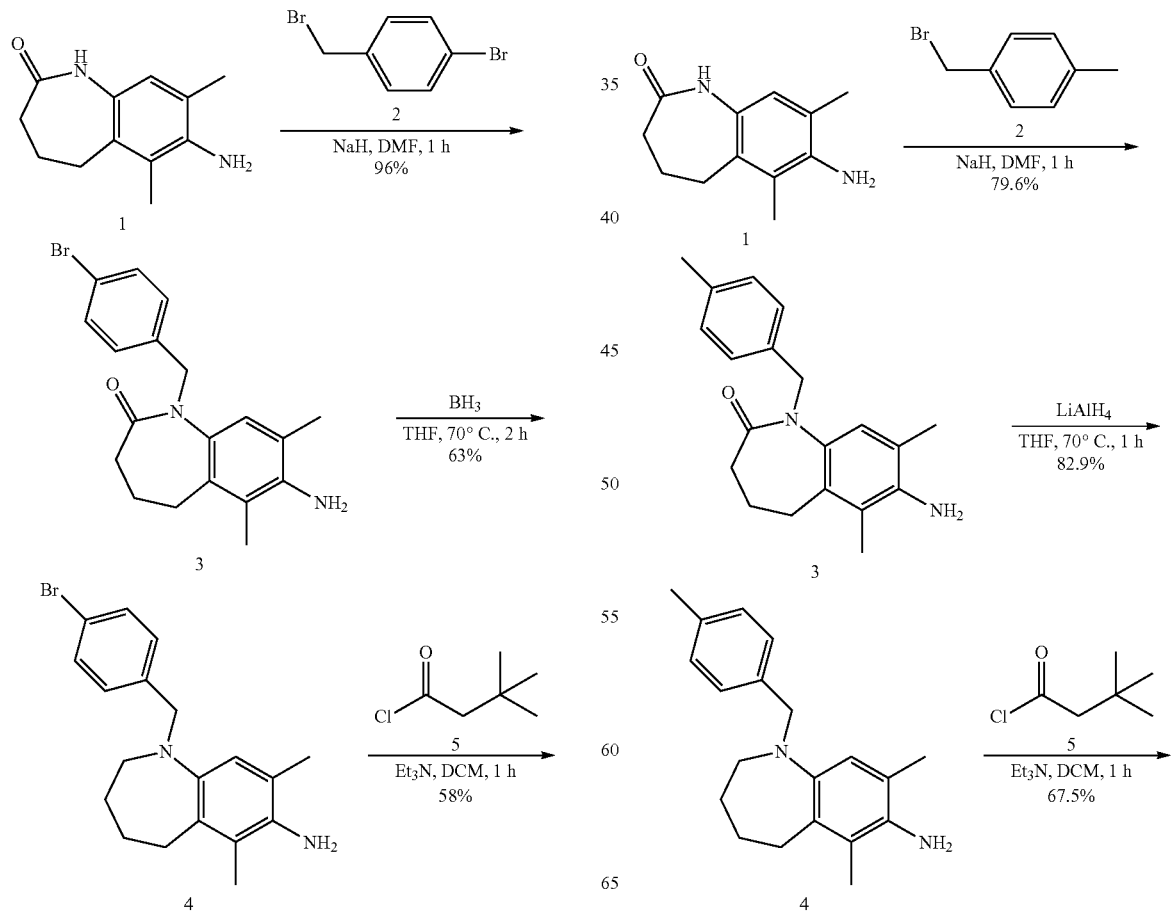

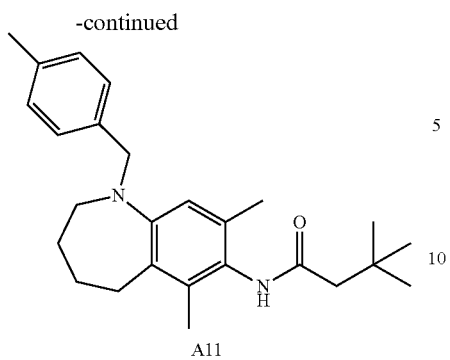

A11

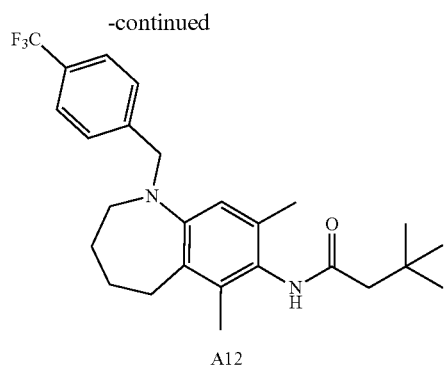

A12

Refer to the synthesis method of Compound A1, a white solid N-(6,8-dimethyl-1-(4-methylbenzyl)-2,3,4,5-tetra-hydro-1H-benzo[b]azepine-7-yl)-3,3-dimethylbutamide (Compound A11, 233.3 mg, 67.5% yield) was obtained.

LC-MS: [M+H]$^+$=393.3

$^1$H NMR (400 MHz, DMSO): δ 8.91 (s, 1H), 7.28 (d, J=7.8 Hz, 2H), 7.13 (d, J=7.8 Hz, 2H), 6.69 (s, 1H), 4.20 (s, 2H), 2.82 (s, 4H), 2.27 (s, 3H), 2.18 (s, 2H), 2.07 (s, 3H), 2.04 (s, 3H), 1.50 (s, 4H), 1.05 (s, 9H).

Refer to the synthesis method of Compound A1, a white solid N-(6,8-dimethyl-1-(4-(trifluoromethyl)benzyl)-2,3,4,5-tetrahydro-1H-benzo[b]azaepine-7-yl)-3,3-dimethylbutylamide (Compound A12, 66 mg, 24% yield) was obtained.

LC-MS: [M+H]$^+$=447.2.

$^1$H NMR (400 MHz, DMSO): δ 7.58 (d, J=8.0 Hz, 2H), 7.52 (d, J=8.0 Hz, 2H), 6.70 (s, 1H), 6.60 (s, 1H), 4.33 (s, 2H), 3.11-3.05 (m, 2H), 2.92 (s, 2H), 2.85 (s, 2H), 2.29 (s, 2H), 2.21 (s, 3H), 2.18 (s, 3H), 1.40 (t, J=7.2 Hz, 2H), 1.15 (s, 9H).

EXAMPLE 12 PREPARATION OF COMPOUND A12

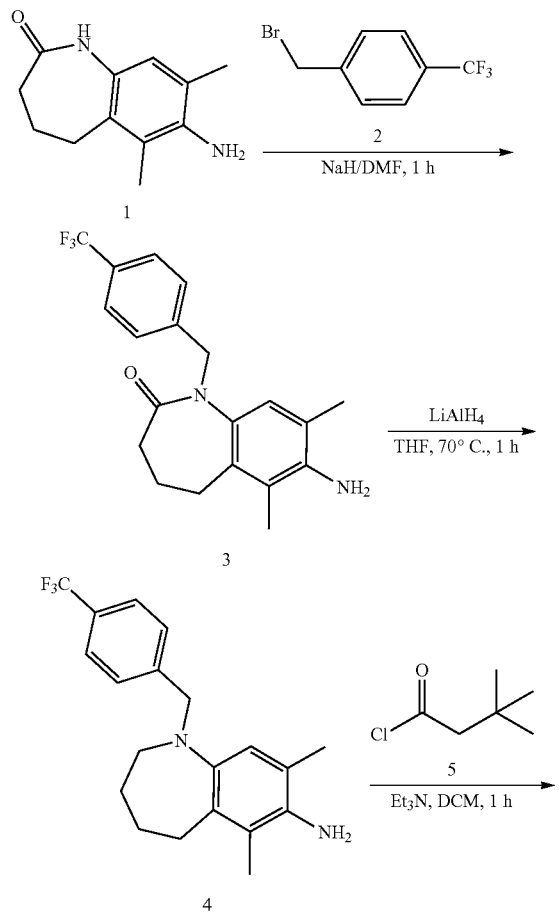

EXAMPLE 13 POTASSIUM ION CHANNEL OPENER ACTIVITY TEST (FDSS/μCELL DETECTION)

1. Experimental Method 1.1 Experimental Process

Cell preparation: CHO-KCNQ2 cells were cultured in a 175 cm$^2$ culture flask, and when the cell density grew to 60~80%, the culture medium was removed, washed with 7 mL PBS (Phosphate Buffered Saline) once, then 3 mL 0.25% Trypsin was added to digest. After the digestion was completed, 7 mL culture medium (90% DMEM/F12+10% FBS+ 500 μg/mL G418) was added to neutralize, centrifugated for 3 minutes at 800 rpm, the supernatant was aspirated, then 5 mL culture medium was added to resuspend, and then the cells were counted.

Cell plating: the density to 3×10$^4$/well was adjusted according to the results of cell counting. After standing at room temperature for 30 minutes, placed in a 37° C. CO$_2$ incubator and incubated overnight for 16-18 hours. The cell density reached about 80%.

Fluorescent dye incubation: discarded the cell culture medium, 80 μL/well loading buffer was added, and incubated in the dark at room temperature for 60 minutes.

Compound incubation: discarded the loading buffer, 80 μL/well prepared compound solution was added, incubated in the dark at room temperature for 20 minutes.

Fluorescence data collection: FDSS/μCELL instrument was used for real-time fluorescence signal recording, excitation wavelength was 480 nm, emission wavelength was 540 nm, recorded 1 times per second, recorded for 10 seconds after baseline and started to add 20 μL/well stimulation buffer, and then continued to record until the end of 180 seconds.

1.2 Solution Preparation

Loading buffer: 10 mL/plate, the preparation method was as follows:

| Component | Volume |
| --- | --- |
| PowerLoad ™ Concentrate, 100× (ingredient C) | 100 μL |
| FluxOR ™ reagent, rebuilt in DMSO (step 1.2) | 10 μL |
| Deionized water | 8.8 mL |
| FLuxOR ™ test buffer, 10× (ingredient B) | 1 mL |
| Probenecid, reconstituted in deionized water (step 1.1) | 100 μL |
| Total volume | 10 mL |

Test buffer sample: 100 mL/plate, the preparation method was as follows:

| Component | Volume |
| --- | --- |
| Deionized water | 8.9 mL |
| FLuxOR ™ test buffer, 10× (ingredient B) | 1 mL |
| Probenecid, reconstituted in deionized water (step 1.1) | 100 μL |
| Total volume | 10 mL |

Stimulation buffer: 5 mL/plate, the preparation method was as follows:

| Component | Volume +K⁺ | Volume −K⁺ |
| --- | --- | --- |
| Deionized water | 2.5 mL | 3.5 mL |
| FluxOR ™ Chlorine-free buffer, 5× (ingredient E) | 1 mL | 1 mL |
| $K_2SO_4$ concentrate (125 mM $K_2SO_4$ concentrated solution, ingredient F) | 1 mL | — |
| $Tl_2SO_4$ concentrate (50 mM $Tl_2SO_4$ concentrated solution, ingredient G) | 0.5 mL | 0.5 mL |
| Total volume | 5 mL | 5 mL |

The above buffer comes from a commercially available kit, the kit name is FluxOR potassium ion channel assay, the manufacturer's brand is invitrogen, the catalog number is F10017, and the lot number is 913728.

1.3 Compound Preparation 20 mM compound stock solution in DMSO was prepared, 10 μL of 20 mM compound stock solution was took into 20 μL DMSO solution, serially diluted 3 times to 8 intermediate concentrations; then the intermediate concentrations of the compound were took to the test buffer, diluted 200 times to get the final concentration to be tested, 80 μL was took and added to the test plate.

The highest test concentration was 100 μM, followed by 100, 33.33, 11.11, 3.70, 1.23, 0.41, 0.137, 0.045 μM respectively, total 8 concentrations. Each concentration set 3 duplicates.

The content of DMSO in the final test concentration did not exceed 0.5%. This concentration of DMSO had no effect on the KCNQ2 potassium channel.

1.4 Data Analysis

Experimental data was analyzed by Excel 2007 and GraphPad Prism 5.0 software, and the ratio of 180 seconds was calculated to calculate the excitement effect. The excitement effect of the compound was calculated by the following formula:

Percentage of excitement $$\frac{\text{Fluorescence signal ratio with compound} - \text{Fluorescence signal ratio without compound}}{\text{Fluorescence signal ratio without compound}} \times 100\%$$

1.5 Quality Control

Environment: Temperature ~25° C.
Reagent: FluxOR™ Detection Kit (Invitrogen, Cat #F0017)
The experimental data in the report must meet the following criteria: Z' Factor>0.5

2. Determination Results: See Table 1 for Details, Where the Smaller $EC_{50}$ is, the Higher the Activity of the Corresponding Compound is

TABLE 1

| Test results of some compounds of the present invention | | |
| --- | --- | --- |
| Compound number | Compound structure | $EC_{50}$ (uM) |
| ZTZ240 (positive control) |  | 8.23 |
| Compound A1 | 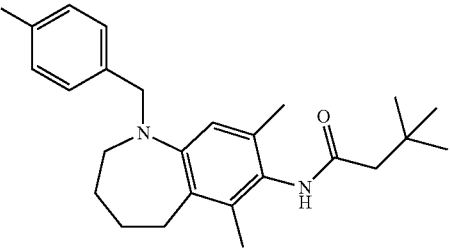 | 0.083 |

TABLE 1-continued
Test results of some compounds of the present invention
| Compound number | Compound structure | EC$_{50}$ (uM) |
|---|---|---|
| Compound A2 | 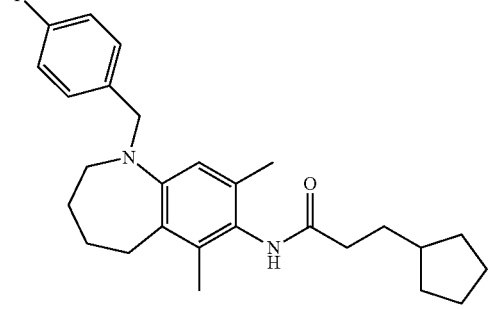 | 0.037 |
| Compound A3 | 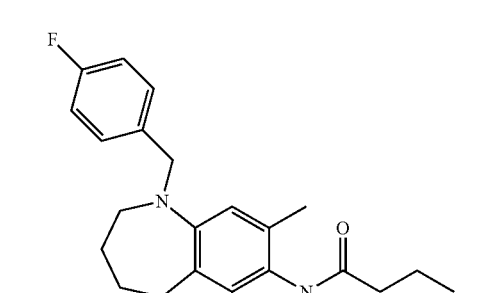 | 0.271 |
| Compound A4 | 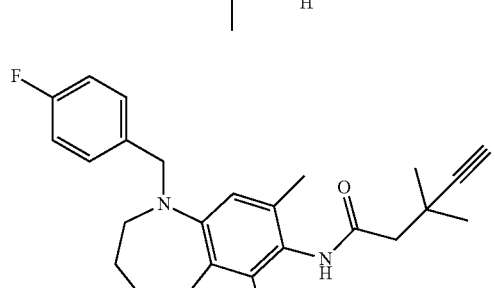 | 0.165 |
| Compound A5 | 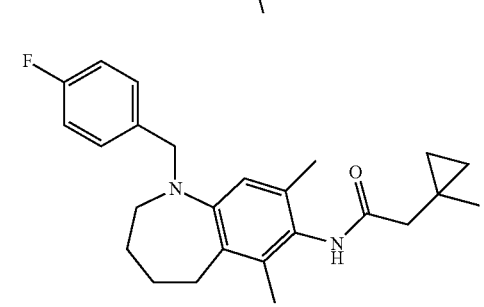 | 0.133 |
| Compound A7 | 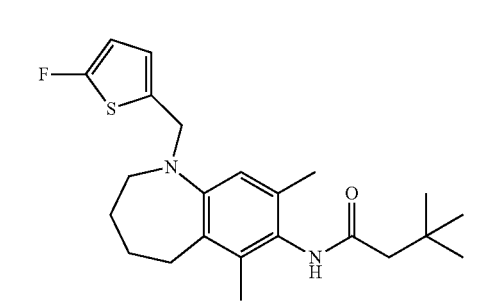 [SMILES: Cc1cc2c(c(C)c1NC(=O)CC(C)(C)C)CCCCN2Cc1ccc(F)s1] | 0.016 |

TABLE 1-continued

Test results of some compounds of the present invention

| Compound number | Compound structure | EC$_{50}$ (uM) |
|---|---|---|
| Compound A6 | [structure] | 0.021 |
| Compound A8 | [structure] | 0.048 |

References for the above test methods:
Zhaobing Gao et al. Journal of Biological Chemistry. 2010, 285(36): 28322-28332.

EXAMPLE 14 STUDY ON THE PHARMACOKINETICS

1) Research Object: To Obtain the Pharmacokinetic Characteristics and Blood-Brain Barrier Condition of Compounds A1 and A4 in Male ICR Mice 2) Experimental Content Take a healthy male ICR mouse (weight range: 18-22 grams in), grouping, 24 mice/group, and 3 mice/time point, fasting for more than 12 hours (only oral administration group), administration, blood was collected by cardiac puncture at time points 0.083 (only iv), 0.25, 0.5, 1, 2, 4, 6 (only po), 8 and 24 hours, at least 0.3 mL of whole blood was collected to EDTA-K2 anti-coagulation tube, within half an hour, plasma was taken by centrifuge (6000 revolutions, 8 minutes, 4° C.), frozen at −20° C. for later use. At the same time, brain tissue was collected in the oral group. After being rinsed with the physiological saline, the water absorbing paper was used to dry, weighed, and frozen at −20° C. for later use.

Experimental results: According to the blood drug concentration data obtained, the non-compartmental model of WinNonlin® 7.0 software (Pharsight, USA) was used to calculate the pharmacokinetic parameters after administration.

TABLE 2

PK parameters for single administration of A1 in male ICR mice

| Parameter | Unit | Intravenous 0.3 mg/kg plasma | Gavage 1 mg/kg plasma |
|---|---|---|---|
| T$_{1/2}$ | h | 5.32 | 5.42 |
| T$_{max}$ | h | — | 0.50 |
| C$_{max}$ | ng/mL | 110 | 94.4 |
| AUC$_{last}$ | hr*ng/mL | 73 | 138 |
| AUC$_{Inf}$ | hr*ng/mL | 74 | 139 |
| F | % | — | 56.9 |

TABLE 3

PK parameters for single administration of A4 in male ICR mice

| Parameter | Unit | Intravenous 0.5 mg/kg plasma | Gavage 2.5 mg/kg plasma |
|---|---|---|---|
| T$_{1/2}$ | h | 1.9 | 1.95 |
| T$_{max}$ | h | — | 0.50 |
| C$_{max}$ | ng/mL | 294 | 256.8 |
| AUC$_{last}$ | hr*ng/mL | 234.9 | 509.6 |
| AUC$_{Inf}$ | hr*ng/mL | 255.2 | 540.7 |
| F | % | — | 43.39 |

TABLE 4

Cerebral blood ratio at each time point after a single oral administration in male ICR mice

| | Time point | Compound A1 (1 mg/kg) | Compound A4 (2.5 mg/kg) |
|---|---|---|---|
| Cerebral blood ratio | 1 h | 1.4 | 1.1 |
| | 2 h | 1.2 | 1.1 |

TABLE 4-continued

Cerebral blood ratio at each time point after a single oral administration in male ICR mice

| Time point | Compound A1 (1 mg/kg) | Compound A4 (2.5 mg/kg) |
|---|---|---|
| 4 h | 1.2 | 1.3 |
| 8 h | 1.8 | 1.1 |

Cerebral blood ratio is very important for neurological drugs. From Table 4, it can be seen that: the compound of the present invention has an excellent cerebral blood ratio, which will bring better efficacy and superior safety.

EXAMPLE 15 SAFETY RESEARCH

1. Object

To observe the toxicity of compound B1, B2, A1, A2, A6, A7, A8 administered by a single tail vein injection to SD rats, determine the maximum tolerated dose, and provide reference for subsequent toxicity test design.

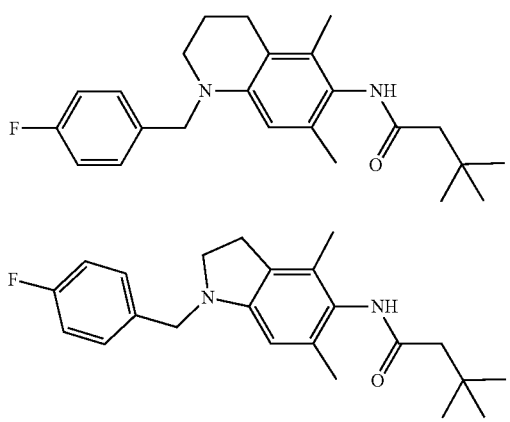

2) Method

Male Sprague-Dawley (SD) rats (SPF grade) were selected, divided into groups (3 rats per group), and administered via tail vein injection. Single administration, observed for 48 hours after administration. During the experiment, two cage-side observations and two detailed clinical observations were performed every day (observation was carried out before and 2 hours after the administration on the day of administration). Toxicity study animals were weighed and recorded every day, and food consumption of each animal for 24±1 hours was measured and recorded every day. At the end of the experiment (D3), euthanasia was performed by carbon dioxide inhalation anesthesia and the death of the animal was ensured by abdominal aorta/venous bleeding, and gross anatomy was performed and recorded.

3) Result 0 (Vehicle control) was given by single intravenous injection, and all animals have no abnormal reaction.

TABLE 5

Safety research experimental results

| Compound | Dosage (mg/kg) | Detailed clinical observation | Maximum tolerated dose (mg/kg) |
|---|---|---|---|
| A1 | 0.3 | No obvious abnormalities | MTD > 1 mg/kg |
|  | 1 | Tremors, proneness and weakness of limbs occurred after administration, and the symptoms disappeared about 5 minutes after administration |  |
| A7 | 0.3 | No obvious abnormalities | MTD > 1 mg/kg |
|  | 1 | After administration, there was a slight tremor, the activity was reduced, and the symptoms disappeared about 5 minutes after administration |  |
| A2 | 0.3 | No obvious abnormalities | MTD > 1 mg/kg |
|  | 1 | No obvious abnormalities |  |
| A6 | 0.3 | No obvious abnormalities | MTD > 1 mg/kg |
|  | 1 | No obvious abnormalities |  |
| A8 | 0.3 | No obvious abnormalities | MTD > 1 mg/kg |
|  | 1 | No obvious abnormalities |  |
| B1 | 0.06 | Tremors and proneness after administration, and the symptoms disappeared about 5 minutes after administration | 0.06 mg/kg < MTD < 0.3 mg/kg |
|  | 0.3 | The animals died immediately after administration |  |
| B2 | 0.3 | Tremors, proneness and weakness of limbs occurred after administration, and the symptoms disappeared about 13 minutes after administration | 0.3 mg/kg < MTD < 1 mg/kg |
|  | 1 | After administration, tremors, weakness of limbs and loss of righting reflex occurred, and ⅔ animals died |  |

It can be seen from the above experimental results that the series of compounds of the present invention have no obvious toxicity at a dose of 0.3 mg/kg; compounds A1 and A7 have a transient slight toxicity at a dose of 1 mg/kg, and the remaining compounds have no obvious toxicity. Compound B1 at 0.3 mg/kg and compound B2 at 1 mg/kg showed unacceptable toxicity. Therefore, compared with compounds B1 and B2, the compounds of the present invention have better safety.

All literatures mentioned in the present invention are incorporated by reference herein, as though individually incorporated by reference. Additionally, it should be understood that after reading the above teaching, many variations and modifications may be made by the skilled in the art, and these equivalents also fall within the scope as defined by the appended claims.

The invention claimed is:

1. A compound represented by formula A or a pharmaceutically acceptable salt thereof, Formula A

[Structure of Formula A: bicyclic amine with R1-CH2-N, aromatic ring with R2, R3 substituents, and NH-C(O)-(CH2)m-R4]

wherein,

R₁ is a substituted or unsubstituted group selected from the group consisting of $C_{6-10}$ aryl and 4-7 membered heteroaryl containing 1-3 heteroatoms selected from N, O or S, and the substituted means being substituted by one or more halogen substituents R₂ and R₃ are each independently $C_{1-6}$ alkyl;

R₄ is selected from the group consisting of $C_{1-6}$ alkyl and $C_{3-6}$ cycloalkyl; and m is selected from the group consisting of 0, 1, 2, and 3.

2. The compound of claim 1 or a pharmaceutically acceptable salt thereof, wherein:

R₁ is a substituted $C_{6-10}$ aryl, and the substituted means being substituted by 1, 2, 3, 4 or 5 halogen substituents.

3. The compound of claim 1 or a pharmaceutically acceptable salt thereof, wherein:

R₁ is a substituted $C_{6-10}$ aryl, and the substituted means being substituted by 1, 2, 3, 4 or 5 halogen substituents; and R₄ is a $C_{3-6}$ cycloalkyl.

4. The compound of claim 1 or a pharmaceutically acceptable salt thereof, wherein:

R₁ is a substituted or unsubstituted 4-7 membered heteroaryl containing 1, 2 or 3 heteroatoms selected from N, O or S, and the substituted means being substituted by 1, 2, 3, 4 or 5 halogen substituents.

5. The compound of claim 1 or a pharmaceutically acceptable salt thereof, wherein:

R₁ is a substituted 4-7 membered heteroaryl containing 1, 2 or 3 heteroatoms selected from N, O or S, and the substituted means being substituted by 1, 2, 3, 4 or 5 halogen substituents; and R₄ is a $C_{3-6}$ cycloalkyl.

6. The compound of claim 1 or a pharmaceutically acceptable salt thereof, wherein the compound is selected from the group consisting of:

[Chemical structures of compounds]

-continued

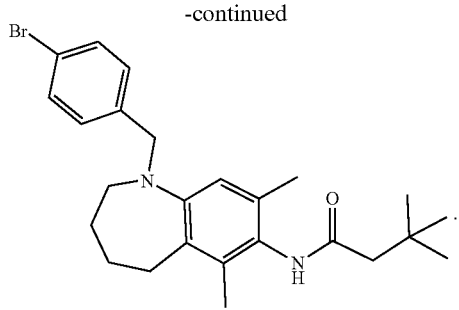

7. A pharmaceutical composition comprising one or more pharmaceutically acceptable carriers and one or more compounds of claim 1 or one or more pharmaceutically acceptable salts thereof.

8. A medicament comprising the compound of claim 1 or a pharmaceutically acceptable salt thereof, wherein the medicament is for:
1) treating a disease related to potassium ion channels;
2) regulating ion flow in the potassium channels of mammals; and/or
3) treating and/or inhibiting a disorder or conditions that responds to abnormalities of ion current in potassium channels, wherein the disease related to potassium ion channels or the disorder or condition that responds to abnormalities of ion current in potassium channels is selected from the group consisting of epilepsy, inflammatory pain, neurological pain, migraine, insomnia, anxiety disorder, stroke, cocaine abuse, nicotine withdrawal, alcohol withdrawal or tinnitus.

9. A method for preparing the compound of claim 1 or a pharmaceutically acceptable salt thereof comprising the following steps:

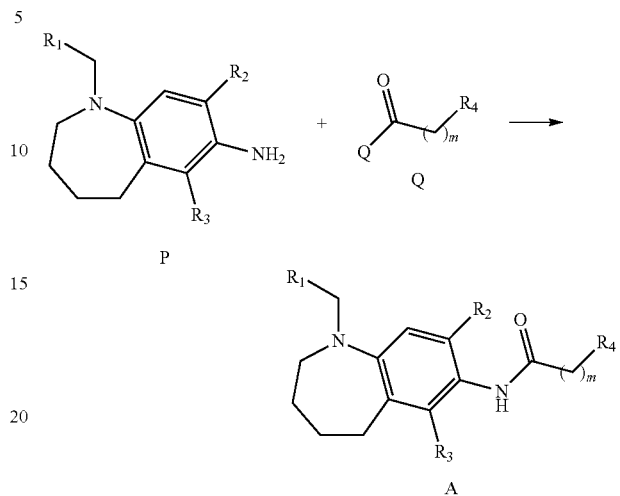

reacting a compound of formula P with a compound of formula Q to obtain a compound of formula A;

wherein

Q is selected from the group consisting of halogen and hydroxyl.

* * * * *